(12) United States Patent
Vijayvergia

(10) Patent No.: US 11,195,177 B1
(45) Date of Patent: Dec. 7, 2021

(54) DISTRIBUTED LEDGER SYSTEMS FOR TRACKING RECURRING TRANSACTION AUTHORIZATIONS

(71) Applicant: United Services Automobile Association (USAA), San Antonio, TX (US)

(72) Inventor: Gunjan Vijayvergia, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 682 days.

(21) Appl. No.: 15/365,885

(22) Filed: Nov. 30, 2016

Related U.S. Application Data

(63) Continuation-in-part of application No. 15/243,500, filed on Aug. 22, 2016.
(Continued)

(51) Int. Cl.
*G06Q 20/40* (2012.01)
*G06Q 20/38* (2012.01)

(52) U.S. Cl.
CPC ....... *G06Q 20/401* (2013.01); *G06Q 20/3829* (2013.01)

(58) Field of Classification Search
None
See application file for complete search history.

(56) References Cited

U.S. PATENT DOCUMENTS 10,068,228 B1* 9/2018 Winklevoss ......... G06Q 20/065
2005/0283434 A1* 12/2005 Hahn-Carlson ........ G06Q 10/10
705/39
(Continued)

FOREIGN PATENT DOCUMENTS

AU 2016101183 A4 9/2016
CN 105681301 A 6/2016
(Continued)

OTHER PUBLICATIONS

Rizzo—"Paydici Launches Recurring Bitcoin Billing for Small Merchants", https://www.coindesk.com/markets/2014/10/22/paydici-launches-recurring-bitcoin-billing-for-small-merchants/ (Year: 2014).*
(Continued)

*Primary Examiner* — Neha Patel
*Assistant Examiner* — Gabriel Mercado
(74) *Attorney, Agent, or Firm* — Fletcher Yoder, P.C.

(57) ABSTRACT

In an example computer-implemented method executed by at least one processor, a first notification is received at a first computing system in a distributed computing network from a second computing system in the distributed computing network. The first notification identifies a first block in a distributed blockchain. The first block encodes authorization data describing a recurring payment authorization between a user and a merchant. The authorization data includes an account identifier associated with an account held by the user, and an identity of the merchant. The first block is obtained by the first computing system from the distributed computing network. The first block is decoded by the first computing system to determine an association between the user, the account, and the merchant.

20 Claims, 16 Drawing Sheets

Related U.S. Application Data

(60) Provisional application No. 62/208,164, filed on Aug. 21, 2015.

(56) References Cited

U.S. PATENT DOCUMENTS

| | | | |
|---|---|---|---|
| 2010/0299230 A1* | 11/2010 | Patterson | G06Q 20/405 705/30 |
| 2014/0244494 A1* | 8/2014 | Davis | G06Q 20/3274 705/41 |
| 2015/0154562 A1* | 6/2015 | Emmerson | G06Q 20/1235 705/59 |
| 2015/0332395 A1 | 11/2015 | Walker et al. | |
| 2015/0363770 A1 | 12/2015 | Ronca et al. | |
| 2015/0363777 A1 | 12/2015 | Ronca et al. | |
| 2015/0363778 A1 | 12/2015 | Ronca et al. | |
| 2015/0363782 A1 | 12/2015 | Ronca et al. | |
| 2015/0363783 A1 | 12/2015 | Ronca et al. | |
| 2015/0379510 A1 | 12/2015 | Smith | |
| 2016/0125405 A1* | 5/2016 | Alterman | G06Q 20/385 705/44 |
| 2016/0203477 A1 | 7/2016 | Yang et al. | |
| 2016/0224977 A1 | 8/2016 | Sabba et al. | |
| 2016/0234026 A1 | 8/2016 | Wilkins et al. | |
| 2016/0253663 A1 | 9/2016 | Clark et al. | |
| 2016/0260169 A1 | 9/2016 | Arnold et al. | |
| 2016/0321751 A1 | 11/2016 | Creighton, IV et al. | |
| 2016/0321752 A1 | 11/2016 | Tabacco et al. | |
| 2016/0328709 A1* | 11/2016 | Romm | G06Q 20/40 |
| 2016/0328713 A1 | 11/2016 | Ebrahimi | |
| 2016/0335533 A1* | 11/2016 | Davis | G06F 9/44 |
| 2016/0342978 A1 | 11/2016 | Davis et al. | |
| 2016/0342989 A1 | 11/2016 | Davis | |
| 2017/0046526 A1* | 2/2017 | Chan | G06Q 20/0655 |
| 2017/0053249 A1 | 2/2017 | Tunnell et al. | |
| 2017/0076280 A1 | 3/2017 | Castinado et al. | |
| 2017/0076286 A1 | 3/2017 | Castinado et al. | |
| 2017/0078299 A1 | 3/2017 | Castinado et al. | |
| 2017/0091397 A1 | 3/2017 | Shah | |
| 2017/0103391 A1 | 4/2017 | Wilson, Jr. et al. | |
| 2017/0109748 A1 | 4/2017 | Kote | |
| 2017/0132625 A1 | 5/2017 | Kennedy | |
| 2017/0132626 A1 | 5/2017 | Kennedy | |
| 2017/0132630 A1 | 5/2017 | Castinado et al. | |
| 2017/0140145 A1 | 5/2017 | Shah | |
| 2017/0140375 A1 | 5/2017 | Kunstel | |
| 2017/0178237 A1 | 6/2017 | Wong | |
| 2017/0228704 A1 | 8/2017 | Zhou et al. | |
| 2017/0230353 A1 | 8/2017 | Kurian et al. | |
| 2017/0230375 A1 | 8/2017 | Kurian | |
| 2017/0236121 A1 | 8/2017 | Lyons et al. | |
| 2017/0243025 A1 | 8/2017 | Kurian et al. | |
| 2017/0243177 A1 | 8/2017 | Johnsrud et al. | |
| 2017/0243208 A1 | 8/2017 | Kurian et al. | |
| 2017/0243209 A1 | 8/2017 | Johnsrud et al. | |
| 2017/0243212 A1 | 8/2017 | Castinado et al. | |
| 2017/0243286 A1 | 8/2017 | Castinado et al. | |
| 2017/0244707 A1 | 8/2017 | Johnsrud et al. | |
| 2017/0244757 A1 | 8/2017 | Castinado et al. | |
| 2017/0270527 A1 | 9/2017 | Rampton | |
| 2017/0286951 A1 | 10/2017 | Ignatchenko et al. | |
| 2017/0287068 A1 | 10/2017 | Nugent | |
| 2018/0205555 A1* | 7/2018 | Watanabe | H04L 9/3247 |

FOREIGN PATENT DOCUMENTS

| | | | | |
|---|---|---|---|---|
| CN | 106204287 A | 12/2016 | | |
| CN | 106408299 A | 2/2017 | | |
| CN | 106506493 A | 3/2017 | | |
| CN | 106600401 A | 4/2017 | | |
| CN | 106611372 A | 5/2017 | | |
| CN | 106682528 A | 5/2017 | | |
| FR | 3025345 A1 * | 3/2016 | | G06Q 20/22 |
| KR | 20160150278 A | 12/2016 | | |
| KR | 101701131 B1 | 2/2017 | | |
| KR | 20170040079 A | 4/2017 | | |
| KR | 101762245 B1 | 7/2017 | | |
| WO | 2016175914 A2 | 11/2016 | | |
| WO | 2017022917 A1 | 2/2017 | | |
| WO | 2017027900 A1 | 2/2017 | | |
| WO | 2017066002 A1 | 4/2017 | | |
| WO | 2017091530 A1 | 6/2017 | | |
| WO | 2017136956 A1 | 8/2017 | | |
| WO | 2017139688 A1 | 8/2017 | | |
| WO | 2017146333 A1 | 8/2017 | | |

OTHER PUBLICATIONS

'wikipedia.com' [online]. "Proof-of-stake," Nov. 2016, [retrieved on Dec. 2, 2016]. Retrieved from the Internet: URL<https://en.wikipedia.org/wiki/Proof-of-stake>. 4 pages.

'wikipedia.com' [online]. "https://en.wikipedia.org/wiki/Blockchain_(database)," Dec. 2016, [retrieved on Dec. 2, 2016]. Retrieved from the Internet: URL<https://en.wikipedia.org/wiki/Proof-of-stake>. 12 pages.

* cited by examiner

DISTRIBUTED LEDGER SYSTEMS FOR TRACKING RECURRING TRANSACTION AUTHORIZATIONS

CROSS-REFERENCE TO RELATED APPLICATIONS

This application is a continuation in part of U.S. application Ser. No. 15/243,500, filed Aug. 22, 2016, which claims priority to U.S. Application Ser. No. 62/208,164, filed on Aug. 21, 2015. The entire contents of the aforementioned applications are incorporated herein.

TECHNICAL FIELD

This disclosure relates to distributed ledger systems, and more particularly to tracking changes in recurring transaction authorizations using distributed ledger systems.

BACKGROUND

Parties often conduct transactions by providing financial account information to others, and authorizing the transfer to funds using the provided information. As an example, a customer can provide a merchant with an account identifier that identifies a specific financial account (e.g., an account number, a routing number, a credit card number, a debit card number, etc.), and authorize the merchant to draw funds from the identified financial account. The merchant draws the funds and, in exchange, furnishes the customer with a good or service.

In some cases, parties can authorize multiple recurring transactions over a period of time. As an example, a customer can provide a merchant with an account identifier that identifies a specific financial account, and authorize the merchant to draw funds from the identified financial account on a recurring basis. The merchant retains the account identifier, and draws funds from the identified financial account as needed (e.g., on demand or periodically). This can be useful, for example, as it enables the customer to conduct multiple transactions with the merchant, without requiring that the customer separately authorize each individual transaction.

However, in some cases, a party's account identifier may change. As an example, if a customer's credit card is stolen, a financial institution may invalidate the original credit card number associated with the customer's account, and issue the customer a new credit card number. Because of this change, merchants having the customer's original credit card number may have difficulty completing transactions.

SUMMARY

In general, in an aspect, a computer-implemented method is executed by at least one processor. The method includes receiving, at a first computing system in a distributed computing network, a first notification from a second computing system in the distributed computing network. The first notification identifies a first block in a distributed blockchain. The first block encodes authorization data describing a recurring payment authorization between a user and a merchant. The authorization data includes an account identifier associated with an account held by the user, and an identity of the merchant. The method also includes obtaining, by the first computing system, the first block from the distributed computing network. The method also includes decoding, by the first computing system, the first block to determine an association between the user, the account, and the merchant.

Implementations of this aspect can include one or more of the following features.

In some implementations, determining the association between the user, the account, and the merchant can include determining that the user authorized a recurring payment with the merchant using the account.

In some implementations, the method can further include determining, by the first computing system, that the account identifier associated with the account has been modified, and generating, by the first computing system, a second block, the second block encoding the modified account identifier and the identity of the merchant. The method can also include transmitting the second block from the first computing system to the distributed computing network, and transmitting a second notification identifying the second block from the first computing system to the second computing system.

In some implementations, determining that the account identifier associated with the account has been modified can include determining that a first account identifier associated with the account has been revoked, and determining a replacement account identifier associated with the account.

In some implementations, the account identifier can include at least one of an account number, a routing number, a credit card number, or a debit card number.

In some implementations, the first block can be encoded, at least in part, based on a public key associated with a financial institution associated with the account and a private key associated with the merchant. The first block can be decodable, at least in part, based on a private key associated with the financial institution and a public key associated with the merchant.

In some implementations, the second block can be encoded, at least in part, based on a private key associated with the financial institution and a public key associated with the merchant. The second block can be decodable, at least in part, based on a public key associated with the financial institution and a private key associated with the merchant.

In some implementations, the method can further include generating, by the first computing system, validation data corresponding to the second block, and transmitting the validation data from the first computing system to the distributed computing network.

In some implementations, generating the validation data can include applying a proof of stake protocol to the second additional block to obtain a proof of stake value, where the proof of stake value satisfies a predefined requirement of the proof of stake protocol. Transmitting the validation data to the distributed computing network can include transmitting the proof of stake value to the distributed computing network.

In some implementations, the method can further include maintaining a local copy of the distributed blockchain on the first computing system. The distributed blockchain can include a plurality of blocks. The plurality of blocks can encode additional authorization data describing one or more previous recurring payment authorizations between one or more users and one or more merchants. The method can also include appending the first block to the local copy of the distributed blockchain.

In some implementations, the method can further include appending the second block to the local copy of the distributed blockchain.

In some implementations, the first notification can be received from a smart contract agent maintained by the second computing system.

In some implementations, the second notification can be transmitted by a smart contract agent maintained by the first computing system.

In some implementations, the first notification can include an index value identifying the first block.

In some implementations, the first computing system can be associated with a financial institution. The account can be held by the user with the financial institution.

In general, in another aspect, a system includes a first computing system in a distributed computing network. The first computing system includes one or more processors, and one or more non transitory computer readable media storing instructions operable to cause one or more processors to perform various operations. The operations include receiving, at the first computing system, a first notification from a second computing system in the distributed computing network. The first notification identifies a first block in a distributed blockchain. The first block encodes authorization data describing a recurring payment authorization between a user and a merchant. The authorization data includes an account identifier associated with an account held by the user, and an identity of the merchant. The operations also include obtaining, by the first computing system, the first block from the distributed computing network. The operations also include decoding, by the first computing system, the first block to determine an association between the user, the account, and the merchant.

Implementations of this aspect can include one or more of the following features.

In some implementations, determining the association between the user, the account, and the merchant can include determining that the user authorized a recurring payment with the merchant using the account.

In some implementations, the operations can further include determining, by the first computing system, that the account identifier associated with the account has been modified, and generating, by the first computing system, a second block, the second block encoding the modified account identifier and the identity of the merchant. The operations can also include transmitting the second block from the first computing system to the distributed computing network, and transmitting a second notification identifying the second block from the first computing system to the second computing system.

In some implementations, determining that the account identifier associated with the account has been modified can include determining that a first account identifier associated with the account has been revoked, and determining a replacement account identifier associated with the account.

In some implementations, the account identifier can include at least one of an account number, a routing number, a credit card number, or a debit card number.

In some implementations, the first block can be encoded, at least in part, based on a public key associated with a financial institution associated with the account and a private key associated with the merchant. The first block can be decodable, at least in part, based on a private key associated with the financial institution and a public key associated with the merchant.

In some implementations, the second block can be encoded, at least in part, based on a private key associated with the financial institution and a public key associated with the merchant. The second block can be decodable, at least in part, based on a public key associated with the financial institution and a private key associated with the merchant.

In some implementations, the operations can further include generating, by the first computing system, validation data corresponding to the second block, and transmitting the validation data from the first computing system to the distributed computing network.

In some implementations, generating the validation data can include applying a proof of stake protocol to the second additional block to obtain a proof of stake value, where the proof of stake value satisfies a predefined requirement of the proof of stake protocol. Transmitting the validation data to the distributed computing network can include transmitting the proof of stake value to the distributed computing network.

In some implementations, the operations can further include maintaining a local copy of the distributed blockchain on the first computing system. The distributed blockchain can include a plurality of blocks. The plurality of blocks can encode additional authorization data describing one or more previous recurring payment authorizations between one or more users and one or more merchants. The operations can further include appending the first block to the local copy of the distributed blockchain.

In some implementations, the operations can further include appending the second block to the local copy of the distributed blockchain.

In some implementations, the first notification can be received from a smart contract agent maintained by the second computing system.

In some implementations, the second notification can be transmitted by a smart contract agent maintained by the first computing system.

In some implementations, the first notification can include an index value identifying the first block.

In some implementations, the first computing system can be associated with a financial institution, and wherein the account is held by the user with the financial institution.

The details of one or more embodiments are set forth in the accompanying drawings and the description below. Other features and advantages will be apparent from the description and drawings, and from the claims.

DETAILED DESCRIPTION

Figure 1:
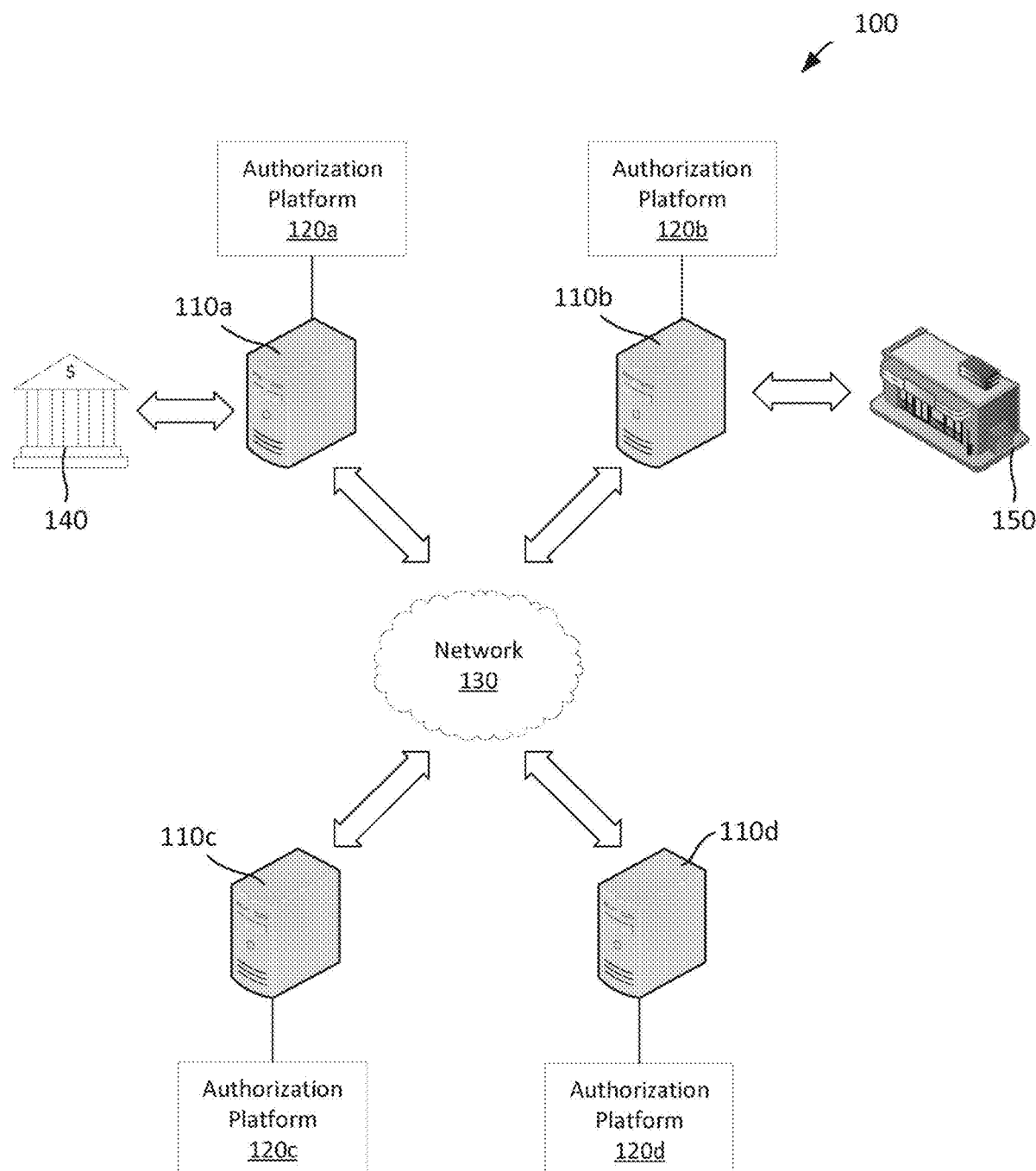
FIG. 1 is a diagram of an example system for tracking recurring transaction authorizations

Implementations of a system for tracking recurring transaction authorizations are described herein. One or more implementations can be used by multiple parties (e.g., one or more merchants, financial institutions, etc.) to maintain accurate and up to date records of recurring transaction authorizations in a distributed ledger (e.g., a "blockchain") in a secure and collaborative manner. In some cases, each party can retrieve information from the distributed ledger, update information stored on the distributed ledger, and/or notify other parties of changes to information stored in the distributed ledger to facilitate the processing of transactions on a recurring basis. In some cases, information stored in the distributed ledger can be encrypted (e.g., encoded), such that only relevant parties can decrypt (e.g., decode) and extract the encrypted information.

As an example, a customer can provide a merchant with a credit card number that identifies a specific financial account, and authorize the merchant to draw funds from the identified financial account on a recurring basis. The merchant can store encrypted information regarding this authorization (e.g., the user's credit card number and the merchant's identity) in the distributed ledger for further retrieval by itself and/or others.

The merchant can further notify the financial institution associated with the user's account (e.g., the financial institution that issued the user's credit card) that the customer has authorized a recurring transaction. In turn, the financial institution can retrieve the pertinent information from the distributed ledger (e.g., the portion of the distributed ledger containing the user's credit card number and the merchant's identity), decrypt the information, and determine, based on that information, the user has specifically authorized the use of a particular financial account with a particular merchant. The financial institution can retain this information for internal use (e.g., to track transaction authorizations submitted by its customers).

In some cases, implementations of the system can be used to distribute updated information pertinent to previously authorized recurring transaction authorizations, such that parties can continue to conduct transactions in an uninterrupted manner.

As an example, if the customer's credit card is stolen, the financial institution can invalidate the original credit card number associated with the customer's account, and issue the customer a new credit card number. Further, the financial institution can determine that the original credit card number was previously used to authorize a recurring transaction with the merchant, encrypt updated information regarding this authorization (e.g., the user's new credit card number and the merchant's identity), and store this information in the distributed ledger for further retrieval by itself and/or others.

The financial institution can further notify the merchant that information pertinent to the prior recurring transaction authorization has changed. In turn, the merchant can retrieve the pertinent information from the distributed ledger (e.g., the portion of the distributed ledger containing the user's new credit card number and the merchant's identity), decrypt the encrypted information, and update its internal records appropriately. Thus, despite a change in the user's credit card number, the user can continue conducting transactions with the merchant on a recurring basis, without requiring that the user manually provide the merchant with the new credit card number.

Implementations of a system can provide various technical benefits. For example, the system can be used to store and distribute information relating to recurring transaction authorizations in a secure manner, such that the information is less likely to be accessed by unauthorized parties (e.g., hackers).

Further, the system can be used to store information in a distributive manner among multiple different systems. Thus, interruptions to portions of the system (e.g., due to network outages, equipment malfunction, attacks by authorized parties, etc.) are less likely to interrupt the functionality of the overall system. As such, the reliability of the system is enhanced.

Further, the system is highly flexible and scalable, and can be readily expanded to accommodate new users (e.g., additional merchants and/or financial institutions) without significantly modifying the architecture of the overall system. Thus, the system can easily deployed and expanded as needed.

Further, the system enables customers to provide a merchant with a single recurring transaction authorization, and subsequently conduct a number of transactions on a recurring basis with that merchant, even if information pertaining to the customer's original recurring transaction authorization has since changed. Thus, the system enables merchants to process transactions more quickly and efficiently, and with fewer interruptions. Further, the system reduces the likelihood that a merchant will attempt to draw funds using invalid account information, thereby reducing or eliminating the consumption of network and computational resources associated with those attempts.

Further, as the customer need only provide the merchant with a recurring transaction authorization once, the amount of resources needed to process communications between the customer and the merchant are reduced. For instance, this can result in reduced consumption of network resources between the customer and the merchant (e.g., between each of their computing devices), as well as reduced consumption of computational resources to interpret those communications.

An example system 100 for tracking recurring transaction authorizations is shown in FIG. 1. The system 100 includes authorization platforms 120a-d, each maintained on a respective computing system 110a-d. The computing systems 110a-d are communicatively connected to one another through a communications network 130 to form a distributed network. The computing systems 110a-d may be referred to as nodes of the distributed network.

In some cases, one or more of the computing system 110a-c can be maintained by or otherwise associated with a respective financial institution (e.g., a bank, credit card issuer, or other institution where funds can be deposited, held, withdrawn, and/or transferred to other) or merchant (e.g., any entity that provides goods or services in exchange for funds, or any entity that processes transactions for those entities). In this example, the computing system 110a is associated with a financial intuition 140, and the computing system 110a is associated with a merchant 150.

A computing system 110a-d can be any electronic device that is used by a user to view, process, transmit and receive data. Examples of computing systems 110a-d include computers (such as desktop computers, notebook computers, server systems, etc.), mobile computing devices (such as cellular phones, smartphones, tablets, personal data assistants, notebook computers with networking capability), and other computing devices capable of transmitting and receiving data (e.g., to and from the other computing systems 110a-d through the network 130). Computing systems 110a-d can include devices that operate using one or more operating system (e.g., Microsoft Windows, Apple OS X, Apple macOS, Apple iOS, Linux, Unix, Android, etc.) and/or architectures (e.g., x86, PowerPC, ARM, etc.) In some implementations, one or more computing devices 110a-d need not be located locally with respect to the rest of system 100, and one or more computing devices 110a-d can be located in one or more remote physical locations.

In some implementations, a user can install a software application onto a computing system 110a-d in order to facilitate performance of the tasks described herein. For example, in some cases, part of all of the authorization platforms 120a-d can be deployed onto each of the computing systems 110a-d through the installation of a software application.

Network 130 can be any communications network through which data can be transferred and shared. For example, network 130 can be a local area network (LAN) or a wide-area network (WAN), such as the Internet. Network 130 can be implemented using various networking interfaces, for instance wireless networking interfaces (such as Wi-Fi, Bluetooth, or infrared) or wired networking interfaces (such as Ethernet or serial connection). Network 130 also can include combinations of more than one network, and can be implemented using one or more networking interfaces.

The computing systems 110a-d are each illustrated as a single component, but in practice can be implemented on one or more computing devices. Each computing system 110a-d can be, for instance, a single computing device that is connected to network 130, and the platforms 120a-d can each be maintained and operated on the single respective computing device. In some implementations, each computing system 110a-d can include multiple computing devices that are connected to network 130, and platforms 120a-d can be maintained and operated on some or all of the computing devices. For instance, each computing system 110a-d can include several computing devices, and platforms 120a-d can each be distributive on one or more of these computing devices. In some implementations, one or more of the computing systems 110a-d need not be located locally to the rest of system 100, and portions of one or more computing systems 110a-d can be located in one or more remote physical locations.

In some implementations, each of the authorization platforms 120a-d can be substantially similar (e.g., implemented using similar hardware and/or software components installed in the computing systems 110a-d). In other implementations, some or all of the authorization platforms 120a-d can differ (e.g., to provide specific functionalities to certain parties, while omitting other functions not relevant to those parties).

Figure 2:
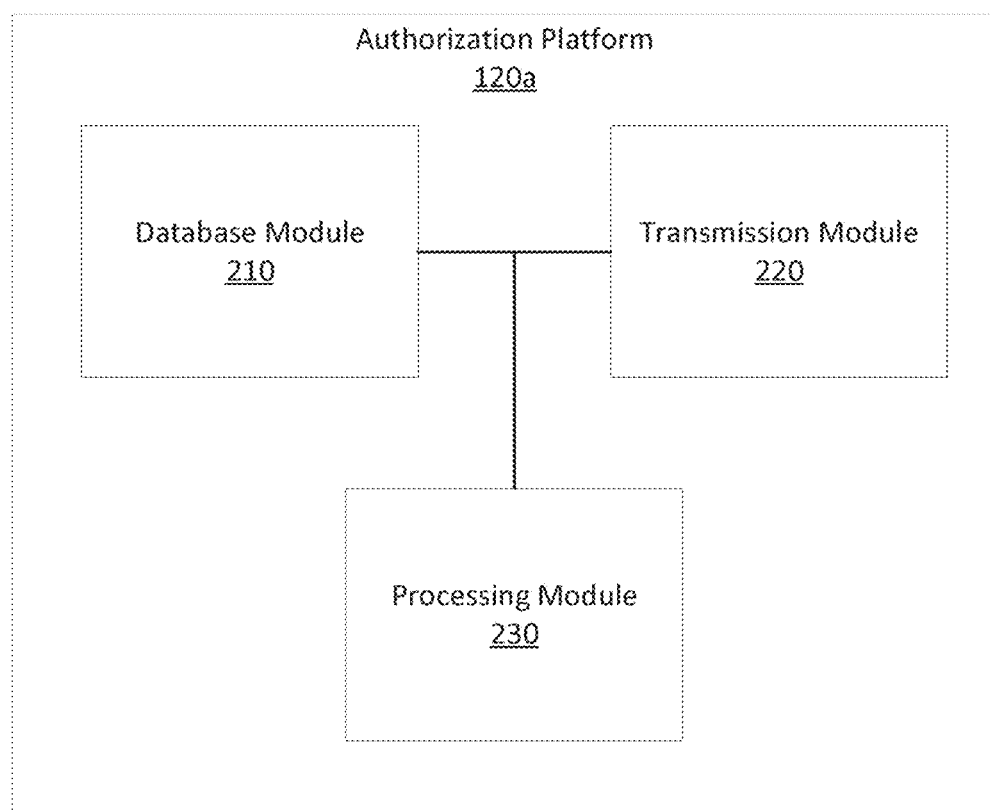
FIG. 2 is a diagram of an example authorization platform.

As an illustrative example, FIG. 2 shows various aspects of an authorization platform 120a. The platform 120a includes several modules that perform particular functions related to the operation of the system 100. For instance, the platform 120a can include a database module 210, a transmission module 220, and a processing module 230.

The database module 210 maintains information related to one or more recurring transaction authorizations. For instance, the database module 210 can store information regarding one or more users (e.g., one or more users holding financial accounts). As an example, this can include a name of a customer, contact information for a customer (e.g., physical address, mailing address, e-mail address, telephone number, etc.), or any other identifying associated with the customer (e.g., a user name, an identification number, etc.). The database module 210 can also store information that enables the possessor of that information to draw funds from a financial account. This can include, for example, an account identifier that identifies a specific financial account (e.g., an account number, a routing number, a credit card number, a debit card number, etc.). The database module 210 can store information identifying a particular merchant with which a customer authorized a recurring transaction. This can be include, for example, a name of a merchant, contact information for a merchant (e.g., physical address, mailing address, e-mail address, telephone number, etc.), or any other identifying associated with the merchant (e.g., a user name, an identification number, etc.)

In some cases, information regarding the recurring transaction authorizations can be consolidated into a ledger. This ledger can include, for example, a record of one or more recurring transaction authorizations with respect to one or more customers and one or more merchants. In some cases, the ledger can include a number of data items, and each data item can include information regarding a specific recurring transaction authorization (e.g., a specific account identifier and a specific merchant for which a specific customer has authorized recurring transactions).

In some cases, a copy of the ledger can be stored locally by an authorization platform 120a and synchronized with copies of the ledgers stored in each of the other authorization platforms 120b-d, such that each authorization platform 120a-d maintains a consistent and complete ledger of each of the recurring transaction authorizations. Collectively, the ledger copies may be referred to as a distributed ledger. As example, the authorization platform 120a can retrieve a copy of a ledger from another authorization platform 120b-d, store a local copy of the ledger, update the local copy of the ledger to reflect new recurring transaction authorizations and/or modifications to information pertaining existing recurring transaction authorizations, and periodically synchronize the copy of the ledger with one or more other authorization platforms 120b-d to ensure data consistency and completeness.

In some cases, some or all of the information in the ledger can be encrypted, such that only authorized parties can decrypt and access that information. For example, in some cases, each data item can be encrypted in such a way that only parties associated with that data item (e.g., the specific financial institution and merchant associated with that authorization) can decrypt and decrypt the information. Thus, the ledger can be distributed among multiple different parties without revealing sensitive information to each and every party.

Although different examples of information are described above, these are merely illustrative. In practice, the database module 210 can store any other information related to the platform 120a (e.g., any other data pertaining to the storage, distribution, updating, and/or access to information within the ledgers), either in addition to or instead of that described here.

Transmission module 220 allows for the transmission of data to and from platform 120a. For example, transmission module 220 can be communicatively connected to network 130, such that it can transmit data to and from one or more other computing systems (e.g., the computing systems 110b-d) through transmission module 220. In some cases, the transmission module 220 can be implemented using hardware (e.g., one or more transceivers, modems, network adapters, and other hardware) and/or software (e.g., computer instructions to control one or more hardware communications components).

Processing module 230 processes data stored or otherwise accessible to platform 120a. For instance, processing module 230 can execute automated or user-initiated processes that manipulate data pertaining to one or more recurring transaction authorizations. As an example, processing module 230 can manipulate data stored on database module 210, or data that is received from transmission module 220. Likewise, processed data from processing module 230 can be stored on database module 210 and/or sent to transmission module 220 for transmission to other devices. In some cases, the processing module 230 can be implemented using hardware (e.g., one or more computer processors) and/or software (e.g., computer instructions to control one or more hardware processing components). Example processes that can be performed by processing module 230 are described in greater detail below.

As described above, one or more implementations of the system 100 can be used to maintain accurate and up to date records of recurring transaction authorizations in a distributed ledger. To illustrate, an example process is described with respect to FIGS. 3A-L. In this example, the computing system 110a is associated with a financial intuition 140, and the computing system 110a is associated with a merchant 150.

Figure 3A:
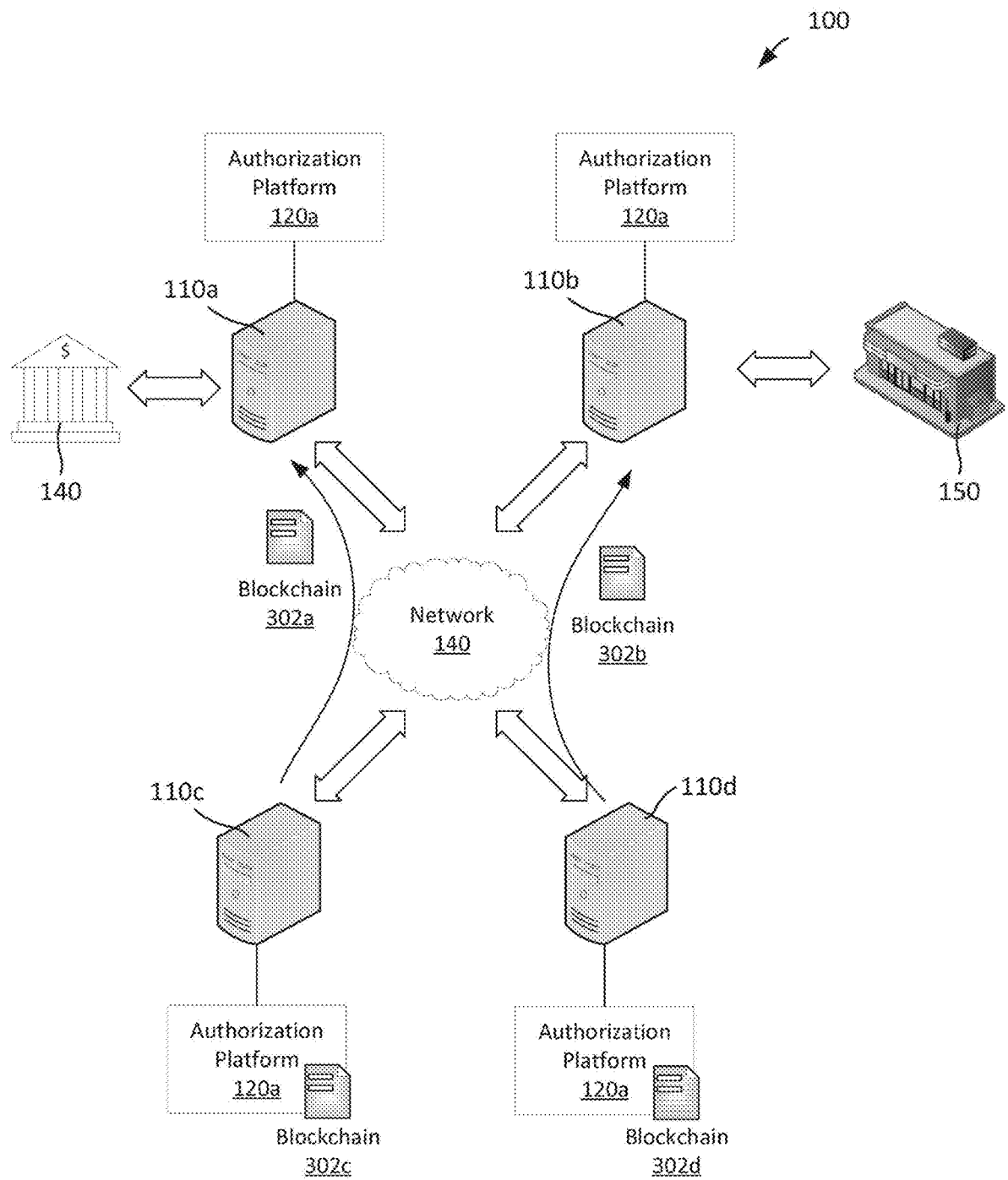
FIGS. 3A-3L are diagrams of an example process of maintaining records of recurring transaction authorizations in a distributed ledger

As shown in FIG. 3A, the computing systems 110c and 110d each maintain a local copy 302c and 302d, respectively, of a blockchain. The blockchain is a distributed ledger provides a record of one or more recurring transaction authorizations with respect to one or more customers and one or more merchants. In some cases, each copy of the blockchain can include a number of data items (e.g., "blocks"), and each data item can include information regarding a specific recurring transaction authorization (e.g., a specific account identifier and a specific merchant for which a specific customer has authorized recurring transactions).

In the example shown in FIG. 3A, the copies 302c and 302d of the blockchain are substantially identical (e.g., they include consistent information regarding previous recurring transaction an authorizations. However, the computing systems 110a and 110b do not yet have copies of the blockchain. To synchronize each of the computing system 110a-d, copies of the blockchain can be transmitted to the computing systems 110 and 110b. For example, as shown in FIG. 3A, a copy 302a of the blockchain can be transmitted from the computing system 110c to the computing system 110a, and a copy 302b of the blockchain can be transmitted from the computing system 110d to the computing system 110b.

Figure 3B:
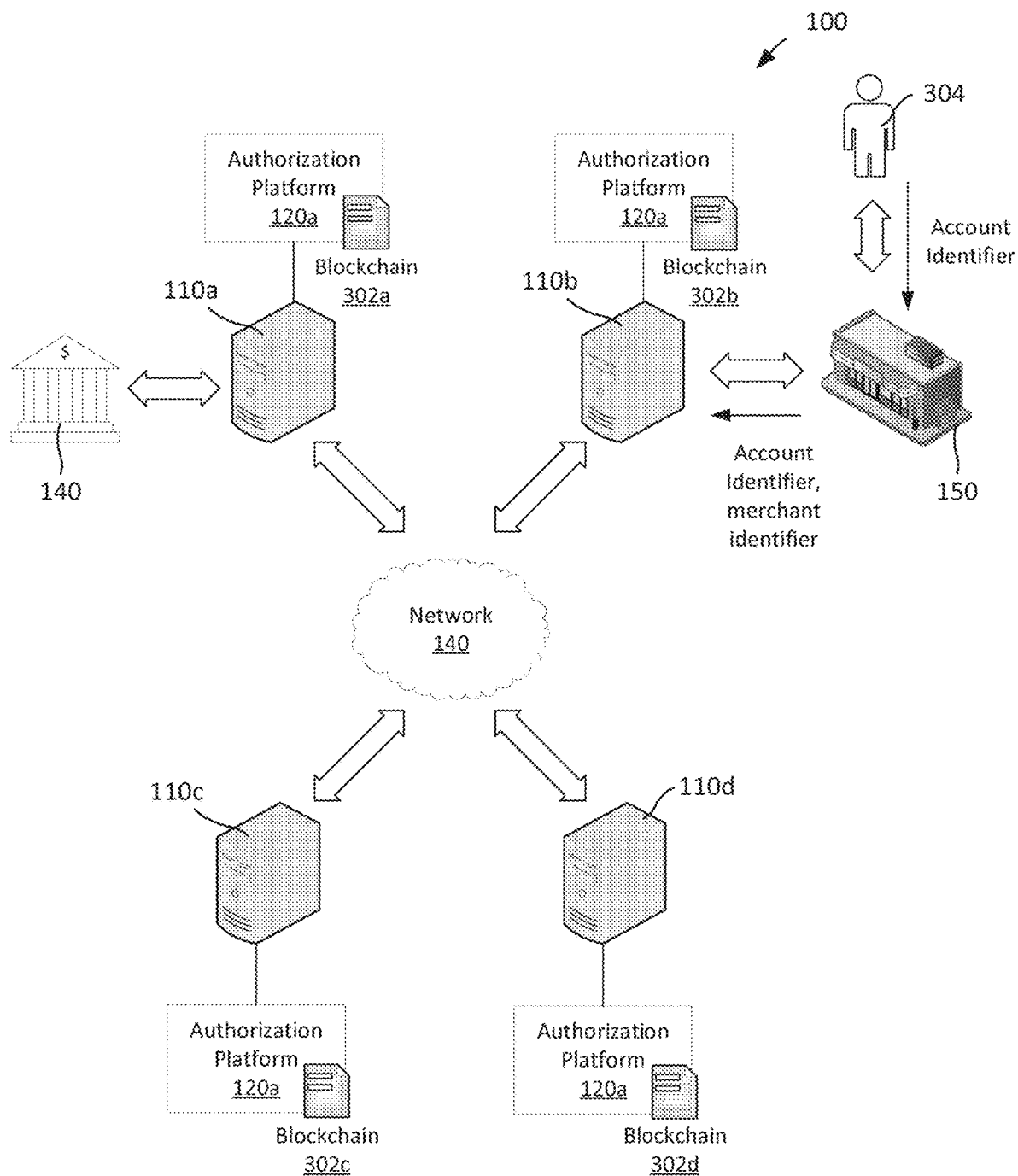

As shown in FIG. 3B, the computing systems 110a and 110b each store a local copy 302a and 302b, respectively. Thus, each of the computing systems 110a-d has a copy 302a-d of the blockchain that is consistent with the other copies 302a-d of the blockchain stored on each of the other computing systems 110a-d.

As also shown in FIG. 3B, a customer 304 communicates with the merchant 150, and authorizes the merchant 150 to conduct transactions on a recurring basis with respect to one of the customer's financial accounts. As an example, the customer 304 can provide the merchant 150 an account identifier that identifies a specific financial account (e.g., an account number, a routing number, a credit card number, a debit card number, etc.), and authorize the merchant 150 to draw funds from the identified financial account. In some cases, the customer 304 can provide the information in person (e.g., in a face to face conversation with one of the merchant's agents). In some cases, the customer 304 can provide the information through a website (e.g., by entering the information into an electronic storefront, web form, or other web page provided by the merchant 150). In some cases, the customer 304 can provide the information using other forms of communication (e.g., telephone, fax, physical mail, e-mail, text message, chat message, and so forth).

Upon receiving the authorization from the customer 304, the merchant 150 provides the account identifier provided by the customer 304, and an identity of the merchant to the computing system 110b. The identity of the merchant can be, for example, a name of a merchant, contact information for a merchant (e.g., physical address, mailing address, e-mail address, telephone number, etc.), or any other identifying information associated with the merchant (e.g., a user name, an identification number, etc.) In some cases, the merchant 150 and/or computing system 110b can maintain a database that tracks the association between the customer 304, and the account identifier provided by the customer 304, such that the account identifier can be retrieved when the customer wishes to conduct a transaction.

Figure 3C:
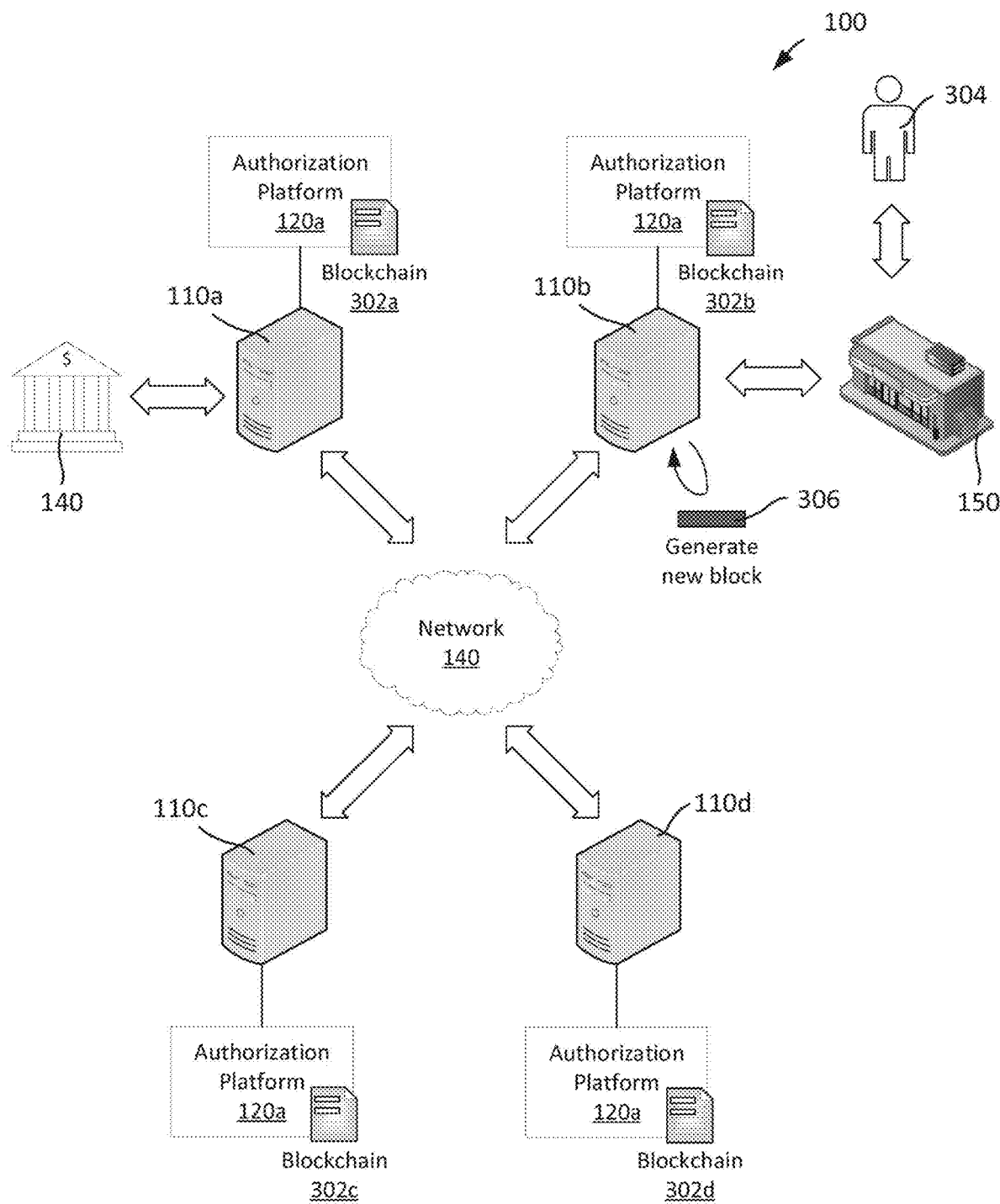

As shown in FIG. 3C, the computing system 110b generates a new block 306 based on the information received from the merchant 150. In some cases, the block 306 can contain both the account identifier provided by the customer 304, and the identity of the merchant 150.

In some cases, the computing system 110b can encrypt some or all of the information contained in the block 306, such that only authorized parties can access that information. For example, the computing system 110b can encrypt the account identifiers and/or merchant identifiers contained in the block 306, such that only the merchant 150 and the financial institution 140 can access that information.

In some cases, the computing system 110b can encrypt information using public-key cryptography. For example, the financial institution 140 can generate a public key and private key pair, and share its public key with the merchant 150. Information encrypted using the financial institution's public key can only be decrypted using the financial institution's private key. Further, information encrypted using the financial institution's private key can only be decrypted using the financial institution's public key.

Similarly, the merchant 150 can generate a public key and private key pair, and share its public key with the financial institution 140. Information encrypted using the merchant's private key can only be decrypted using the merchant's public key. Further, information encrypted using the merchant's public key can only be decrypted using the merchant's private key.

To ensure that only the financial institution 140 and the merchant 150 can access certain information contained within the block 306, the computing system 110b can encrypt that information using both the financial institution's public key, and the merchant's private key. Thus, only a party having the financial institution's private key and the merchant's public key (e.g., the financial institution 140 and associated computing system 110a) can decrypt the information.

In some cases, there may be multiple different financial institutions, each maintaining different financial accounts for its users. In these situations, the computing system 110b can determine the specific financial institution that is maintaining the account identified by the account identifier, and encrypt the information using that specific financial institution's public key. That way, the encryption is specific to the financial institution responsible for maintaining the account identified by the customer 304.

In some cases, the relationship between a financial institution and an account identifier can be encoded in the account identifier itself. For example a credit card number often includes a "bank identification number" (BIN) or "issue identification number" (IIN) as its first 6 digits. The BIN or IIN can uniquely identify a particular financial institution that has issued the credit card. Thus, the computing system 110b can determine, based on the BIN or IIN, a particular financial institution, and then encrypt the information contained within the block 306 using the appropriate public key. In some cases, other such patterns can be encoded in account identifiers (e.g., account numbers, routing numbers, debit card numbers, etc.).

The relationship between a financial institution and an account identifier also can be identified in different ways. For example, in some cases, the customer 304 and/or the merchant 150 can manually identify the financial institution associated with the account identifier.

The computing system 110b can also include verification information in the block 306. Verification information can be, for example, information that demonstrates the validity of the block 306. In some cases, the computing system 110b can digitally sign the block 306, such that computing system's identity is embedded in the block 306. If the block 306 is altered after generation, the digitally signature is invalidated. Thus, based on the digital signature of the block 306, recipients of the block 306 can ascertain that the computing system 110b generated the block, and whether the block 306 has been altered after generation.

In some cases, the computing system 110b can include verification information generated using a proof of stake protocol. For example, each of the computing systems 110a-d can be issued a respective unique token or unit of cryptocurrency. Tokens or items of cryptocurrency are only issued to those with a "stake" in the system 100 (e.g., trusted entities in the system 100). When generating the block 306, the computing system 110b can include information in the block 306 that demonstrates that it is in possession of a token or unit of cryptocurrency. For example, the computing system 110b can generate a computational hash of its token, and include that hash in the block 306. Based on the computational hash, recipients of the block 306 can ascertain that the computing system 110b generated the block (e.g., by applying a second computational hash to the hashed token or unit of cryptocurrency, and verifying that it corresponds to a known value), and thus, can ascertain that the block 306 has been generated by a trusted entity of the system 100.

Figure 3D:
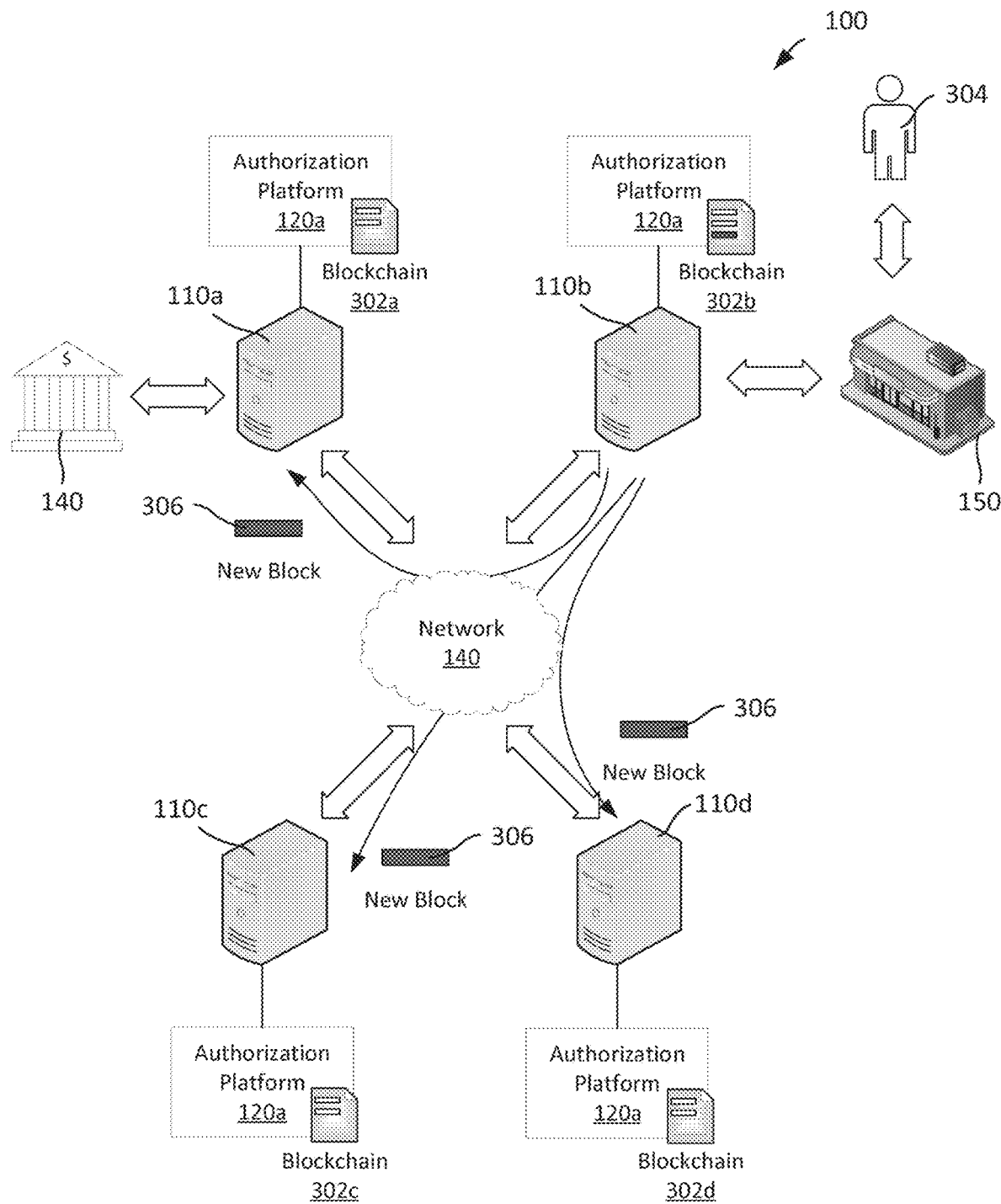

As shown in FIG. 3D, the computing system 110b adds the block 306 to its copy 302b of the blockchain (e.g., by appending the block 306 to the end of the blockchain). The computing system 110b also distributes copies of the block 306 to each of the other computing systems 110a and 110c-d. Although FIG. 3D depicts copies of the block 306 as being transmitted directly from the computing system 110b to each of the other computing systems 110a and 110c-d, this need not be the case. For example, in some cases, the block 306 can be indirectly transmitted between the computing systems 110a-d using one or more of the computing systems 110a-d as intermediaries.

Figure 3E:
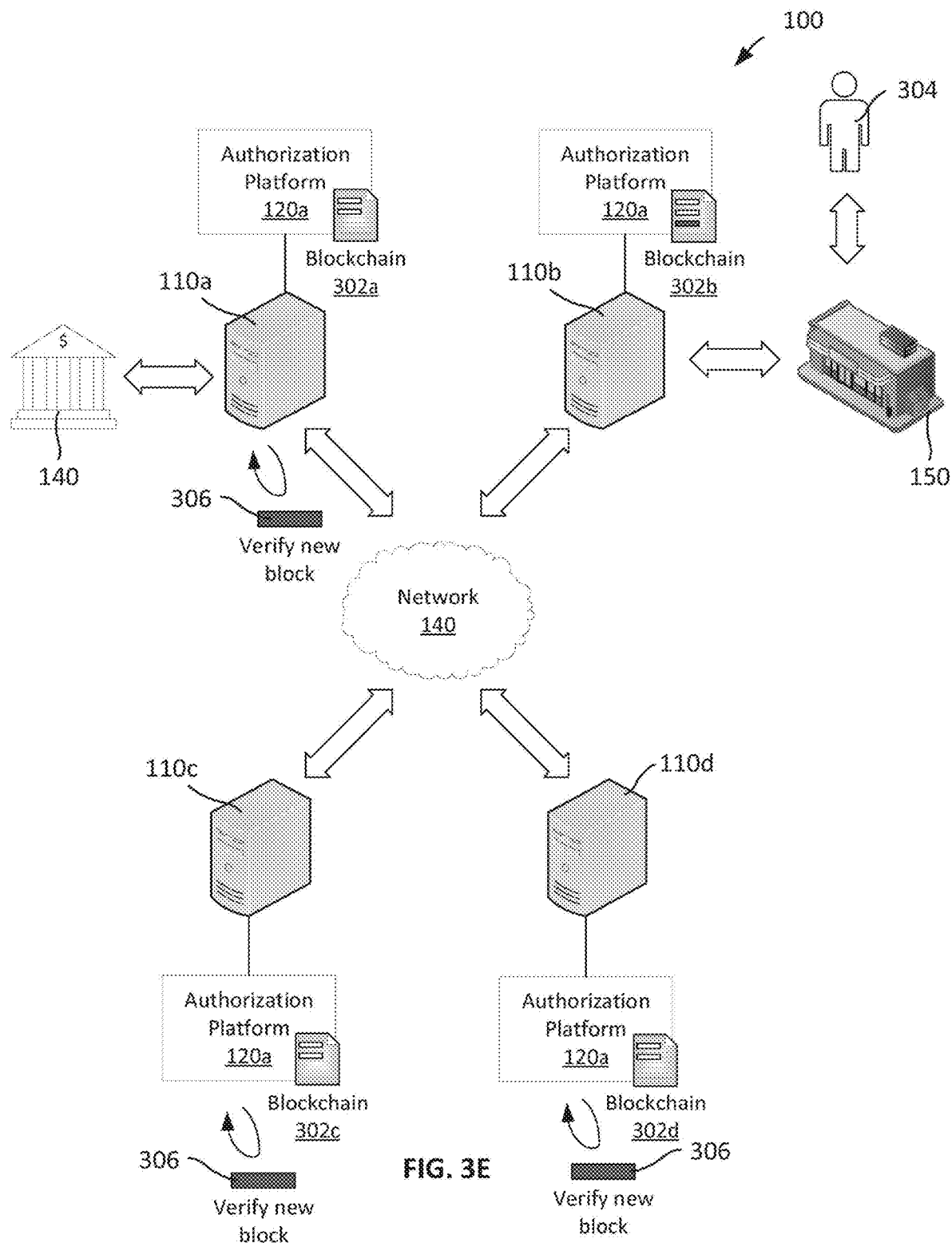

As shown in FIG. 3E, each of the computing systems 110a and 110c-d verify the block 306. For instance, each of the computing systems 110a and 110c-d can examine the verification included in the block 306, and ascertain based on that information whether the block 306 has been generated by a trusted party and/or whether the block 306 has been tampered with after generation. As an example, each of the computing systems 110a and 110c-d can examine the digital signature of the block 306, and based on the digital signature, determine whether the block 306 has been generated by a trusted party and/or whether the block 306 has been tampered with after generation. As another example, each of the computing systems 110a and 110c-d can examine the block 306 according to a proof of stake protocol (e.g., by applying a second computational hash to the hashed token or item of cryptocurrency, and verifying that it corresponds to a known value), and determine that the block 306 was generated by a trusted party in possession with a token or unit of cryptocurrency (e.g., denoting an entity with a "stake" in the system 100).

Figure 3F:
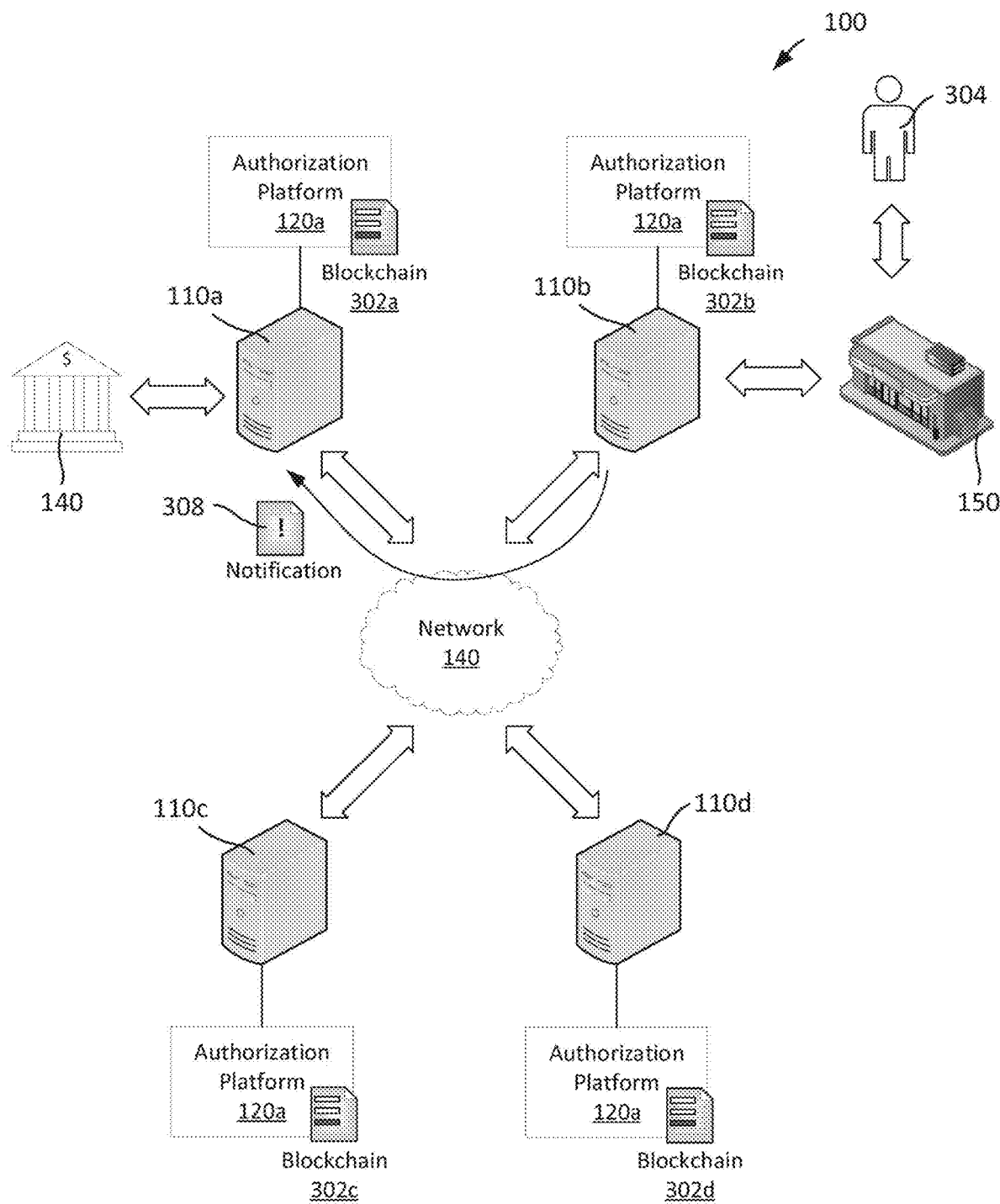

As shown in FIG. 3F, after verifying the validity of the block 306, each of the computing systems 110a and 110c-d adds the block 306 to their respective copies 302a and 302c-d of the blockchain (e.g., by appending the block 306 to the end of the blockchain). Thus, each of the computing systems 110a-d has a copy 302a-d of the blockchain that is consistent with the other copies 302a-d of the blockchain stored on each of the other computing systems 110a-d.

As shown in FIG. 3F, the computing system 110b also transmits a notification 308 to the computing system 110a, alerting the computing system 110a that a block that is relevant to the financial institution 140 (i.e., the block 306) has been distributed among the computing systems 110a-d. In some cases, the notification 308 can identify the block 306 through a block identifier. Each block in the blockchain can be assigned an index value, and the notification 308 can include an index value that identifies the block 306 from among the other blocks in the blockchain. The notification 308 can be, for example, an e-mail, a text message, a chat message, telephone message, fax, or any other communication.

As described herein, in some cases, there may be multiple different financial institutions, each maintaining different financial accounts for its users. For example, one or more of the computing systems 110c and 110d can also be associated with a respective financial institution. In these situations, the computing system 110b can determine the specific financial institution that is maintaining the account identified by the account identifier, and selectively generate a notification 308 specifically for that financial situation. That way, the generated notification is specific to the financial institution responsible for maintaining the account identified by the customer 304.

In some cases, the notification 308 can be generated by a smart contracts agent maintained on the computing system 110a. A smart contracts agent may include hardware and/or software components that facilitate, verify, or enforce the negotiation or performance of a contract between two or more parties. The smart contracts agent can operate in accordance to one or more rules regarding the generation of notifications. For example, the smart contracts agent can monitor the communications between the merchant 150 and the computing system 110b, and determine whether information regarding a recurring transaction authorization has been received from the merchant 150. Based on one or more rules (e.g., one or more rules that define a relationship between an account identifier and a respective financial institution), the smart contracts agent can determine that a particular financial institution is associated with the recurring transaction authorization, then automatically generate a notification to alert the financial institution that a block having information relevant to that financial institution has been distributed, or will be distributed. Thus, financial institutions can be automatically informed shortly after a recurring transaction authorization has been submitted by a customer.

Figure 3G:
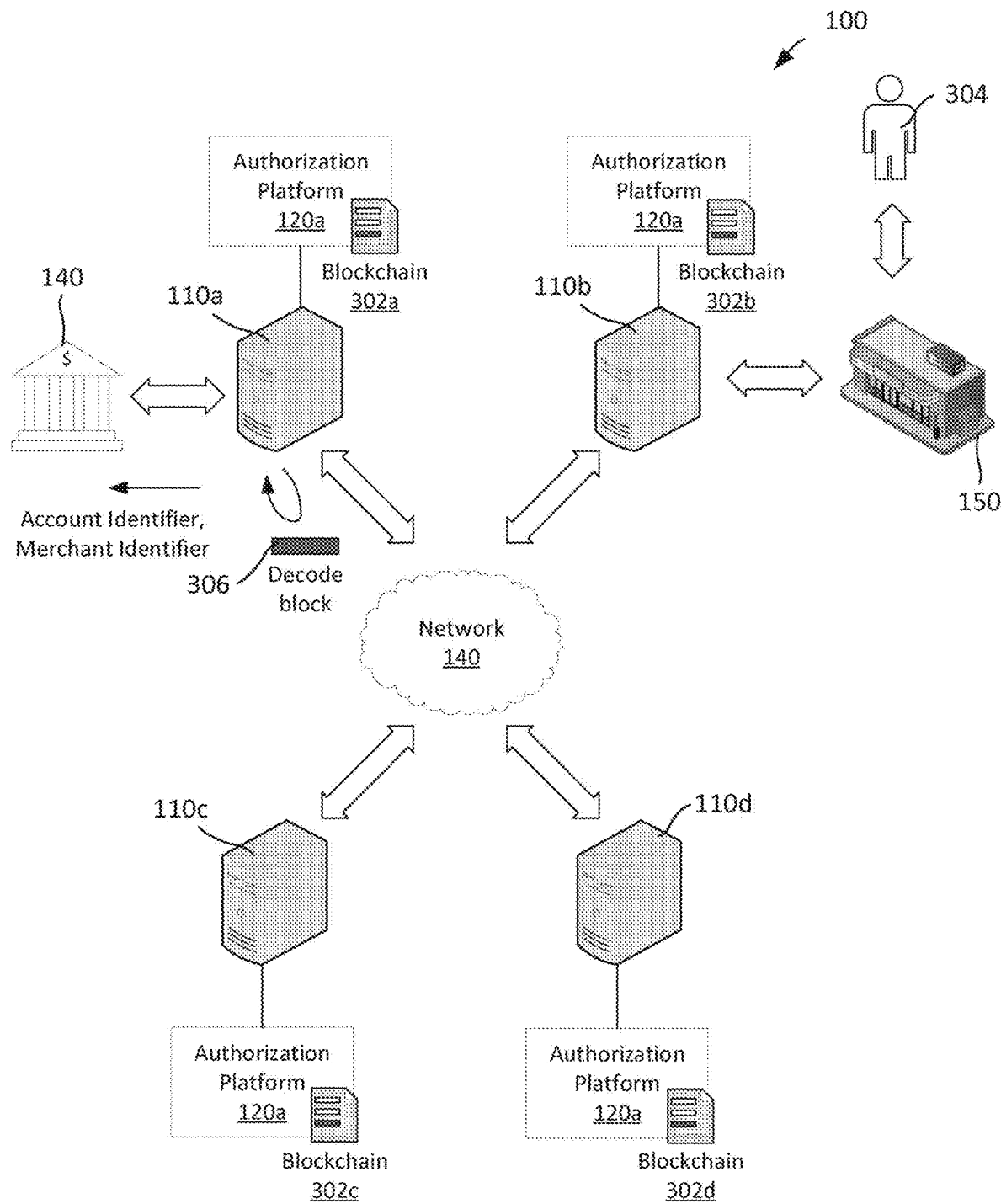

As shown in FIG. 3G, the computing system 110a identifies the block 306 based on the notification 308, retrieves the block 306 from its local copy 302a of the blockchain, and extracts information regarding the recurring transaction authorization from the block 306. For example, if information contained within the block 306 has been encrypted (e.g., encrypted using the private key of the merchant 150, and the public key of the financial institution 140), the computing system 110a can decrypt the information (e.g., using the public key of the merchant 150, and the private key of the financial institution 140).

In some cases, there may be multiple different merchants, each conducting transactions with customers. For example, one or more of the computing systems 110c and 110d can also be associated with a respective merchant. In these situations, the computing system 110a can determine the specific merchant with which the customer 304 authorized a recurring transaction, and decrypt the information using encryption keys specific to that merchant. For example, in some cases, the notification 308 can identify the merchant 150. Based on the notification 308, the computing system 110a can retrieve a public key previously shared by the merchant 150, and use that public key for decrypting (e.g., in combination with the private key of the financial institution 140). As another example, in some cases, the identity of the merchant 150 can be included in unencrypted form in the block 306. Based on this information, the computing system 110a can retrieve a public key previously shared by the merchant 150, and use that public key for decrypting the encrypted information in the block 306 (e.g., in combination with the private key of the financial institution 140).

As shown in FIG. 3G, the financial institution 140 can ascertain the account identifier and the merchant identifier associated with the recurring payment authorization by the customer 304. In some cases, the financial institution 140 and/or computing system 110a can maintain a database that tracks the association between the customer 304, the financial account used by the customer 304 in the recurring transaction authorization, and the merchant 150 with which the customer 304 authorized the recurring transaction. For example, the database can include an entry that identifies that the customer 304 authorized a recurring payment with the merchant 150 using a specific financial account.

As the merchant 150 is in possession an account identifier provided by the customer 304, the merchant 150 can process one or more transactions with the customer 304 using the account identifier on a recurring basis. For example, the customer 304 can submit an order for various goods and services. In response, the merchant 150 can retrieve the account identifier provided by the customer 304, and draw funds using that account identifier. Subsequently, if the customer 304 submits another order, the merchant 150 can again retrieve the account identifier provided by the customer 304, and again draw funds using that account identifier. This can be performed multiple times, without requiring that the customer manually provide the merchant 150 with an account identifier for each individual transaction.

As described herein, in some cases, a customer's account identifier may change. As an example, an unauthorized user may obtain the account identifier (e.g., through theft of a credit card, interception of a communication between the customer and a merchant, or by other means). To protect the customer's financial account, the financial institution may invalidate the original account identifier, and issue a replacement account identifier to the customer. As another example, a financial institution may establish a limited period of validity for each account identifier (e.g., such that an account identifier associated with a financial account periodically changes over time). As another example, a user may request that a particular financial account be consolidated with another financial account. Thus, the financial institution may invalidate the account identifier associated with one of the financial accounts, and consolidate the both accounts under a single financial account.

When a customer's account identifier changes, this may disrupt the customer's previous recurring transaction authorizations. For example, if the user provided a merchant with a particular account identifier, and the account identifier is subsequently identified, the customer may be unable to conduct further transactions without providing a replacement account identifier to the merchant.

However, implementations of the system 100 can reduce or eliminate the need for a customer to manually update this information. For example, implementations of the system 100 can automatically distribute updated information regarding previous recurring transaction authorizations, such that a merchant can automatically obtain valid account identifiers without manual input from the customer.

Figure 3H:
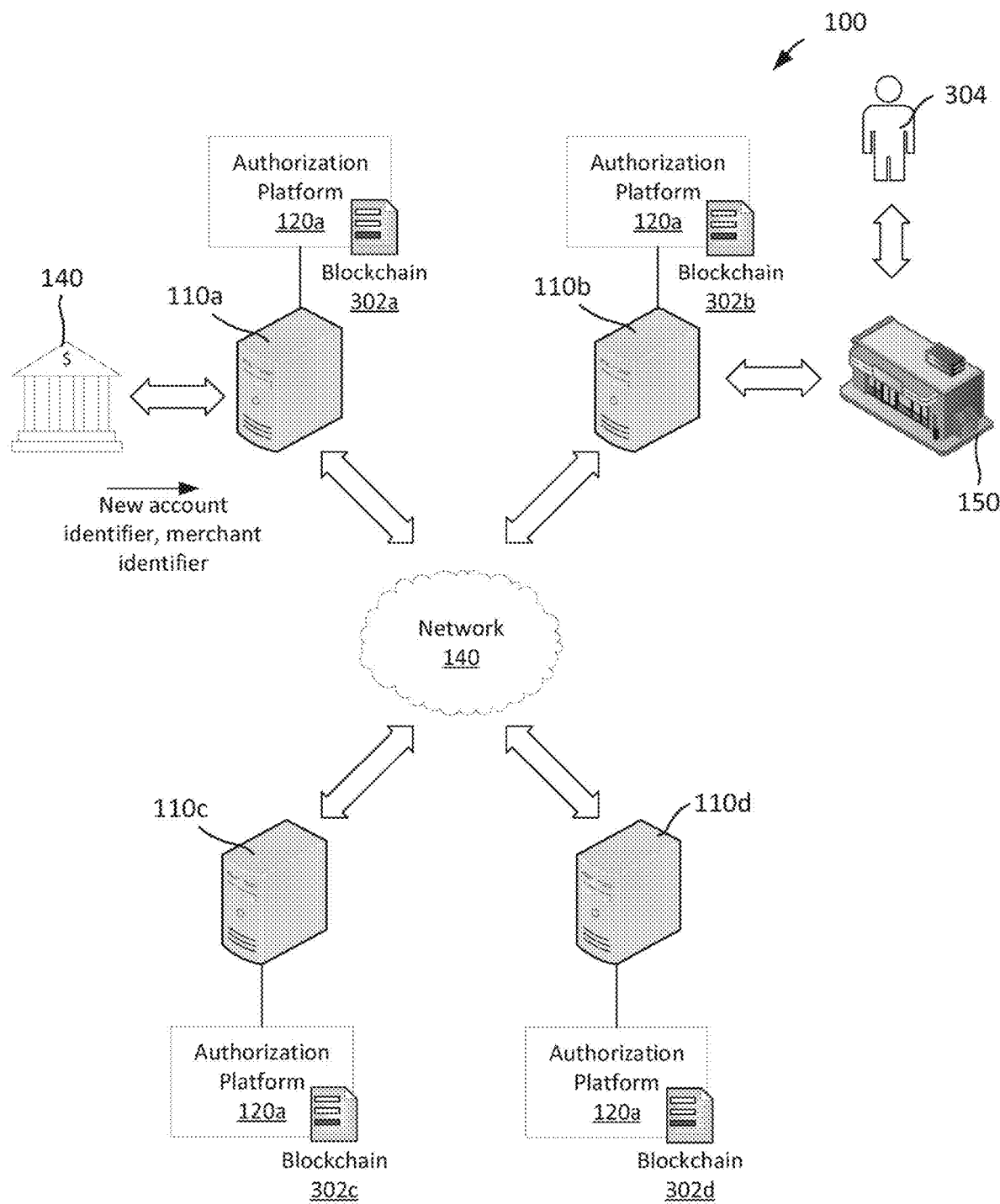

To illustrate, as shown in FIG. 3H, when the financial institution 140 changes the account identifier associated with the recurring transaction authorization between the customer 304 and the merchant 150, the financial institutional 140 provides the computing system 110a with a new account identifier (e.g., a replacement account identifier) and the identity of the merchant 150.

As described herein, in some cases, the financial institution 140 can maintain a database that tracks the association between the customer 304, the financial account used by the customer 304 in the recurring transaction authorization, and the merchant 150 with which the customer 304 authorized the recurring transaction. Upon changing an account identifier associated with the customer's account, the financial institution 140 can examine the database, determine that the original account identifier was used in the recurring transaction authorization between the customer 304 and the merchant 150. Based on this determination, the financial institution can determine that the merchant 150 should receive information regarding the replacement account identifier, such that recurring transactions between the customer 304 and the merchant 150 can continue uninterrupted.

Figure 3I:
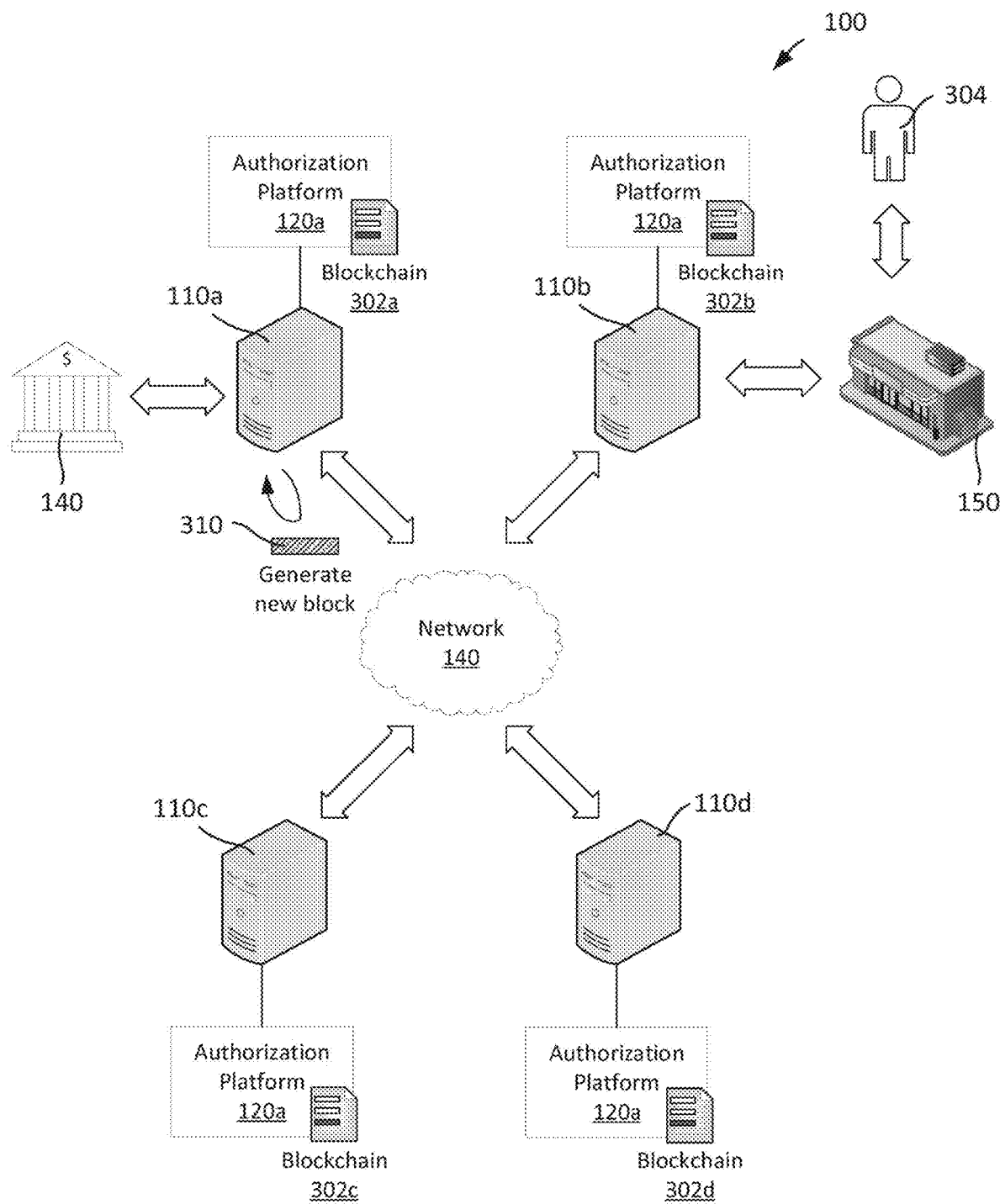

As shown in FIG. 3I, the computing system 110a generates a new block 310 based on the information received from the financial institution 140. In some cases, the block 310 can contain both the new account identifier and the identity of the merchant 150 provided by the financial institution 140, In some cases, the computing system 110a can encrypt some or all of the information contained in the block 310, such that only authorized parties can access that information. For example, the computing system 110a can encrypt the account identifiers and/or merchant identifiers contained in the block 310, such that only the merchant 150 and the financial institution 140 can access that information.

In some cases, the computing system 1110a can encrypt information using public-key cryptography. For example, the financial institution 140 can generate a public key and private key pair, and share its public key with the merchant 150. Information encrypted using the financial institution's public key can only be decrypted using the financial institution's private key. Further, information encrypted using the financial institution's private key can only be decrypted using the financial institution's public key.

Similarly, the merchant 150 can generate a public key and private key pair, and share its public key with the financial institution 140. Information encrypted using the merchant's private key can only be decrypted using the merchant's public key. Further, information encrypted using the merchant's public key can only be decrypted using the merchant's private key.

To ensure that only the financial institution 140 and the merchant 150 can access certain information contained within the block 306, the computing system 110a can encrypt that information using both the financial institution's private key, and the merchant's public key. Thus, only a party having the financial institution's public key and the merchant's private key (e.g., the merchant 150 and associated computing system 110b) can decrypt the information.

In some cases, there may be multiple different merchants, each conducting transactions with customers. For example, one or more of the computing systems 110c and 110d can also be associated with a respective merchant. In these situations, the computing system 110a can determine the specific merchant that requires the new account identifier, and encrypt the information using that specific merchant's public key. That way, the encryption is specific to the merchant that requires the new account identifier.

The computing system 110a can also include verification information in the block 310. Verification information can be, for example, information that demonstrate the validity of the block 310. In some cases, the computing system 110a can digitally sign the block 310, such that computing system's identity is embedded in the block 310. If the block 310 is altered after generation, the digitally signature is invalidated. Thus, based on the digital signature of the block 310, recipients of the block 310 can ascertain that the computing system 110a generated the block, and whether the block 310 has been altered after generation.

In some cases, the computing system 110a can include verification information generated using a proof of stake protocol. For example, as described herein, each of the computing systems 110a-d can be issued a respective unique token or unit of cryptocurrency. Tokens or items of cryptocurrency are only issued to those with a "stake" in the system 100 (e.g., a trusted entities in the system 100). When generating the block 310, the computing system 110a can include information in the block 310 that demonstrates that it is in possession of a token or unit of cryptocurrency. For example, the computing system 110a can generate a computational hash of its token, and include that hash in the block 310. Based on the computational hash, recipients of the block 310 can ascertain that the computing system 110a generated the block (e.g., by applying a second computational hash to the hashed token or item of cryptocurrency, and verifying that it corresponds to a known value), and thus, can ascertain that the block 310 has been generated by a trusted entity of the system 100.

Figure 3J:
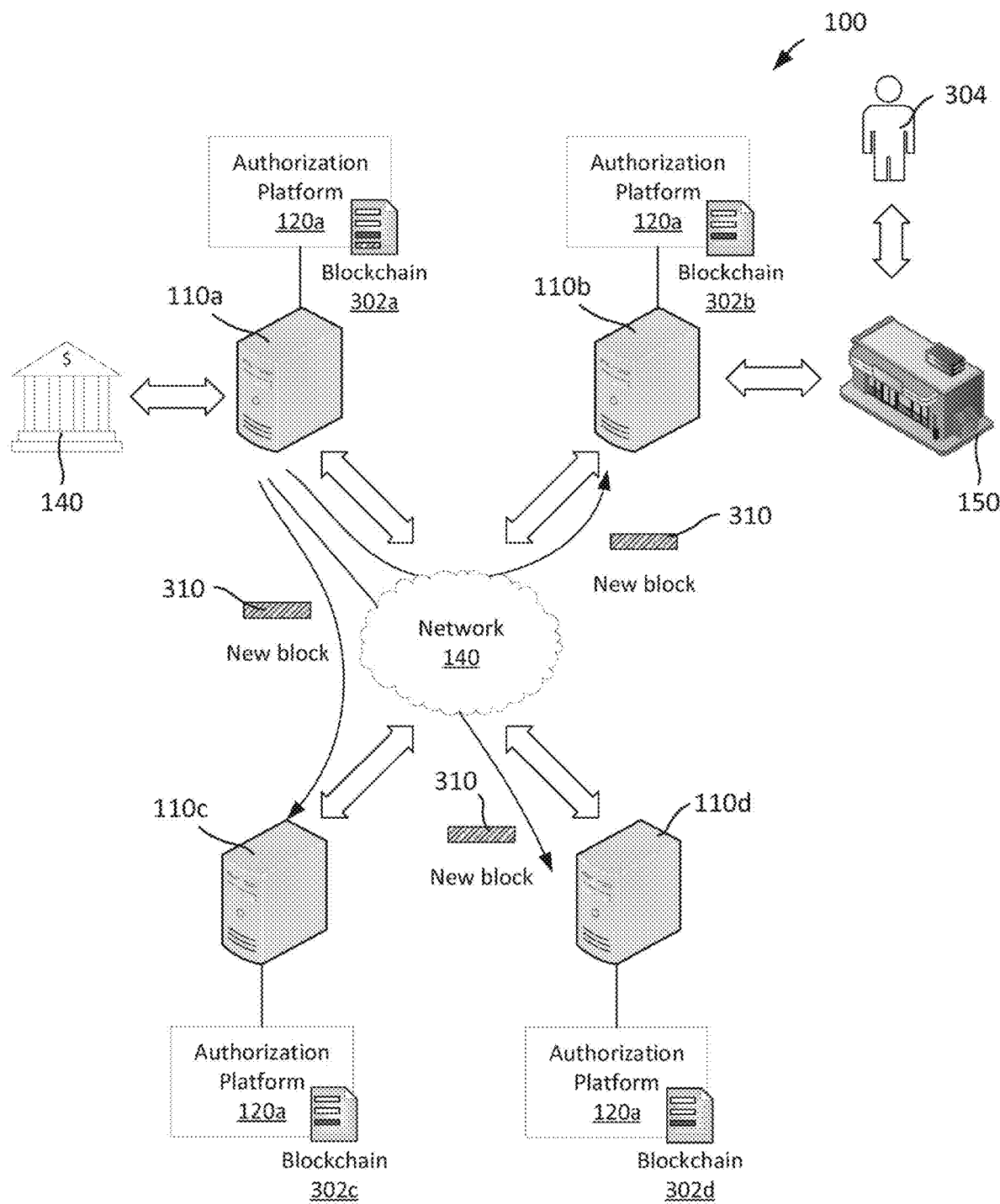

As shown in FIG. 3J, the computing system 110a adds the block 310 to its copy 302a of the blockchain (e.g., by appending the block 310 to the end of the blockchain). The computing system 110a also distributes copies of the block 310 to each of the other computing systems 110c-d. Although FIG. 3J depicts copies of the block 310 as being transmitted directly from the computing system 110a to each of the other computing systems 110b-d, this need not be the case. For example, in some cases, the block 310 can be indirectly transmitted between the computing systems 110a-d using one or more of the computing systems 110a-d as intermediaries.

Each of the computing systems 110b-d may verify the block 310. For instance, each of the computing systems 110b-d can examine the verification included in the block 310, and ascertain based on that information whether the block 310 has been generated by a trusted party and/or whether the block 310 has been tampered with after generation. As an example, each of the computing systems 110b-d can examine the digital signature of the block 310, and based on the digital signature, determine whether the block 310 has been generated by a trusted party and/or whether the block 310 has been tampered with after generation. As another example, each of the computing systems 110b-d can examine the block 310 according to a proof of stake protocol (e.g., by applying a second computational hash to the hashed token or item of cryptocurrency, and verifying that it corresponds to a known value), and determine that the block 310 was generated by a trusted party in possession with a token or unit of cryptocurrency (e.g., denoting an entity with a "stake" in the system 100).

Figure 3K:
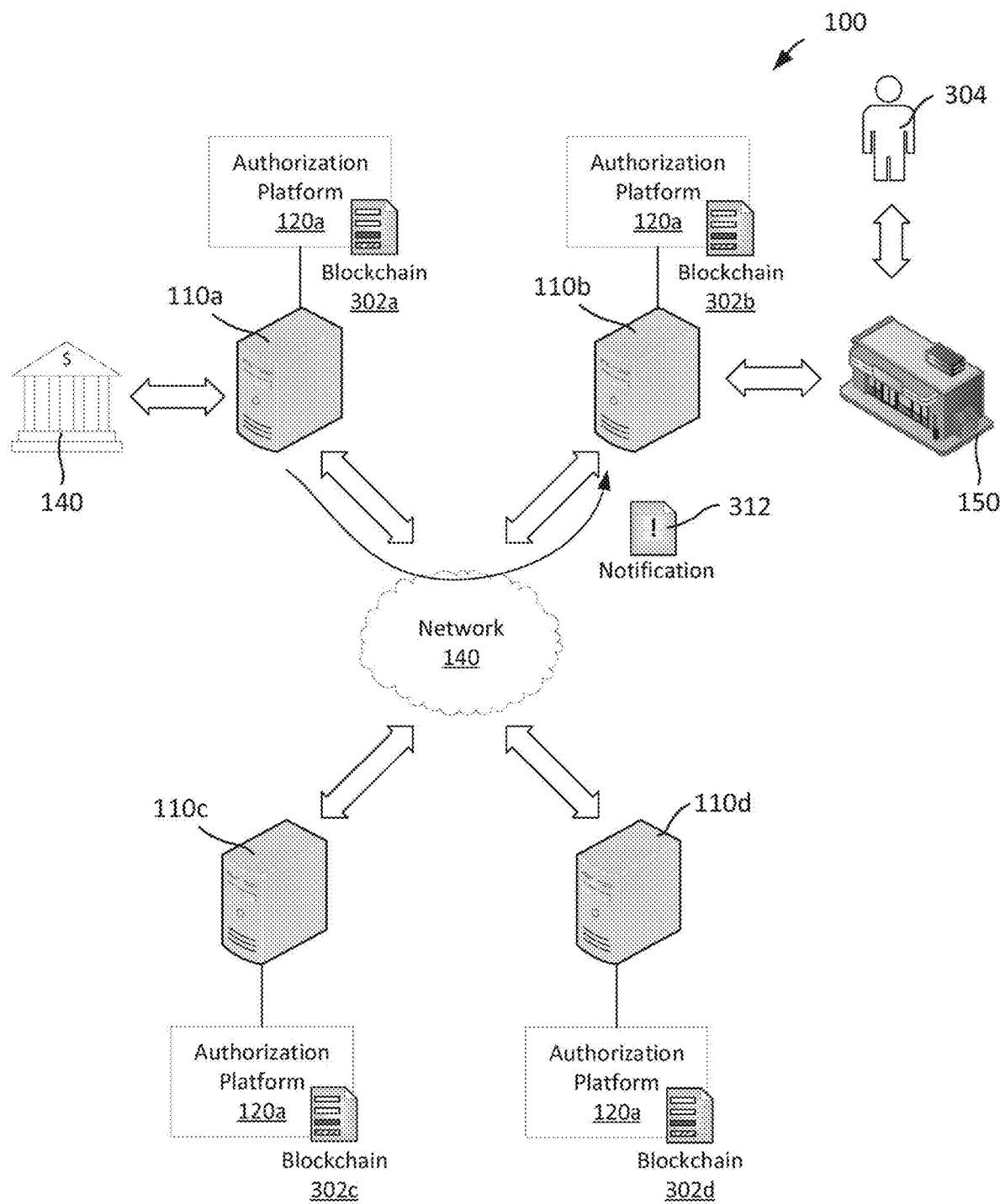

As shown in FIG. 3K, after verifying the validity of the block 310, each of the computing systems 110b-d adds the block 310 to their respective copies 302b-d of the blockchain (e.g., by appending the block 310 to the end of the blockchain). Thus, each of the computing systems 110a-d has a copy 302a-d of the blockchain that is consistent with the other copies 302a-d of the blockchain stored on each of the other computing systems 110a-d.

As shown in FIG. 3K, the computing system 110a also transmits a notification 312 to the computing system 110b, alerting the computing system 110b that a block that is relevant to the merchant 150 (i.e., the block 310) has been distributed among the computing systems 110a-d. In some cases, the notification 312 can identify the block 310 through a block identifier. For each, each block in the blockchain can be assigned an index value, and the notification 312 can include an index value that identifies the block 310 from among the other blocks in the blockchain. The notification 312 can be, for example, an e-mail, a text message, a chat message, telephone message, fax, or any other communication.

As described herein, in some cases, there may be multiple different merchants, each conducting transactions with customers. For example, one or more of the computing systems 110c and 110d can also be associated with a respective merchant. In these situations, the computing system 110a can determine the specific merchant with which the customer 304 authorized a recurring transaction, and selectively generate a notification 312 specifically for that merchant. That way, the generated notification is specific to the merchant that requires the new account identifier.

In some cases, the notification 312 can be generated by a smart contracts agent maintained on the computing system 110a. As described herein, a smart contracts agent may include hardware and/or software components that facilitate, verify, or enforce the negotiation or performance of a contract between two or more parties. The smart contracts agent can operate in accordance to one or more rules regarding the generation of notifications. For example, the smart contracts agent can monitor the communications between the financial 140 and the computing system 110a, and determine whether information regarding a new account identifier has been received from the financial institution 140. Based on one or more rules (e.g., one or more rules that define a relationship between an account identifier and one or more merchant that were previously provided the original account identifier), the smart contracts agent can determine that a particular merchant is associated with the recurring transaction authorization, then automatically generate a notification to alert the merchant that a block having information relevant to that merchant has been distributed, or will be distributed. Thus, merchants can be automatically informed shortly after a new account identifier (e.g., a replacement account identifier) has been issued by a financial institution.

Figure 3L:
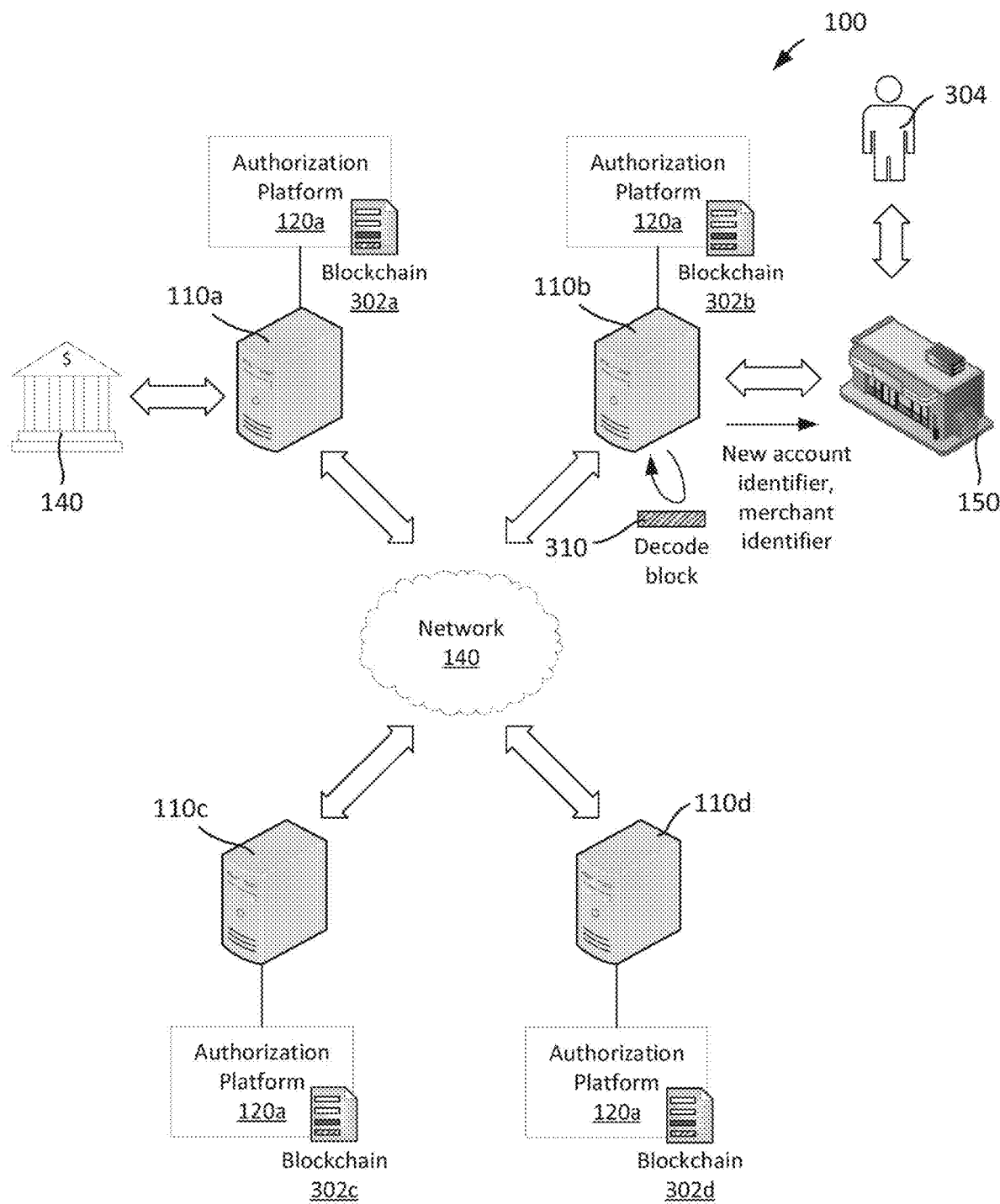

As shown in FIG. 3L, the computing system 110b identifies the block 310 based on the notification 312, retrieves the block 310 from its local copy 302b of the blockchain, and extracts updated information regarding the recurring transaction authorization from the block 310. For example, if information contained within the block 310 has been encrypted (e.g., encrypted using the public key of the merchant 150, and the private key of the financial institution 140), the computing system 110*b* can decrypt the information (e.g., using the private key of the merchant 150, and the public key of the financial institution 140).

In some cases, there may be multiple different merchants, each conducting transactions with customers. For example, one or more of the computing systems 110*c* and 110*d* can also be associated with a respective merchant. In these situations, the computing system 110*b* can determine the specific financial institution that is maintaining the account identified by the new account identifier, and decrypt the information using encryption keys specific to that financial institution. For example, in some cases, the notification 312 can identify the financial institution 140. Based on the notification 312, the computing system 110*b* can retrieve a public key previously shared by the financial institution 140, and use that public key for decrypting (e.g., in combination with the private key of the merchant 150). As another example, in some cases, the identity of the financial institution 140 can be included in unencrypted form in the block 310. Based on this information, the computing system 110*b* can retrieve a public key previously shared by the financial institution 140, and use that public key for decrypting the encrypted information in the block 310 (e.g., in combination with the private key of the merchant 150).

As shown in FIG. 3L, the merchant 150 can ascertain the new account identifier and the merchant identifier provided by the financial institution 140, and update its records accordingly. For example, as described herein, the merchant 150 and/or computing system 110*b* can maintain a database that tracks the association between the customer 304, and the account identifier provided by the customer 304. The merchant 150 and/or computing system 110*b* can update the database, such that the new account number is reflected in the database. Thus, when the customer wishes to conduct a transaction, the merchant 150 can retrieve the new account number, and draw funds using that new account number. Thus, recurring transactions between the customer 304 and the merchant 150 can continue uninterrupted, despite changes to the account identifier originally provided by the customer 304.

Although an example process is shown in FIGS. 3A-L with respect to a single customer 304, a single financial institution 140, and a single merchant 150, this is merely an illustrative example. In practice, a system 100 can include any number of customers, financial institutions, and merchants, and information regarding recurring transactions can be distributed and updated among some or all of them. Thus, each financial institution can be selectively informed of recurring transactions authorized in connection with financial accounts maintained by the financial institution, and each merchant can be selectively informed of updated information regarding previous recurring transaction authorizations by its customers.

Figure 4:
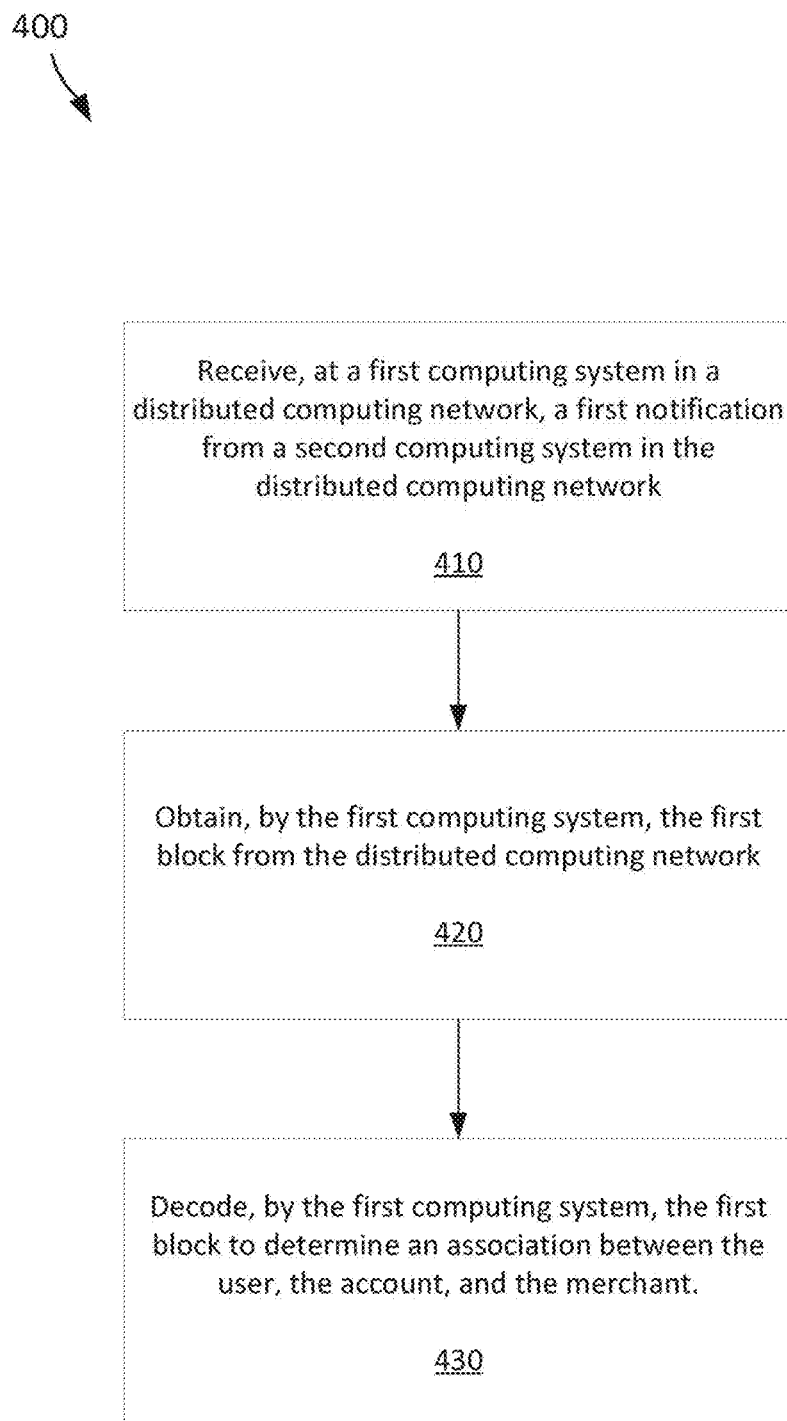
FIG. 4 is a diagram of an example process of maintaining records of recurring transaction authorizations in a distributed ledger.

An example process 400 of maintaining records of recurring transaction authorizations in a distributed ledger is shown in FIG. 4. The process 400 can be executed, for example, by at least one processor (e.g., at least one processor included on a computing systems 110*a-d*).

A first computing system in a distributed computing network receives a first notification from a second computing system in the distributed computing network (step 410). The first notification identifies a first block in a distributed blockchain. The first block encodes authorization data describing a recurring payment authorization between a user and a merchant. The authorization data includes an account identifier associated with an account held by the user, and an identity of the merchant. As an example, the first and second computing system can be the computing systems 110*a* and 110*b*, respectively, shown in FIG. 1.

The first computing system obtains the first block from the distributed computing network (step 420). As an example, the first block can be the block 306 show in FIG. 3G.

The first computing system decodes the first block to determine an association between the user, the account, and the merchant (step 430). As an example, the first computing system can determining that the user authorized a recurring payment with the merchant using the account identified by the account identifier.

In some cases, the process 400 can also include determining, by the first computing system, that the account identifier associated with the account has been modified. Further, the first computing system can generate a second block. The second block can encode the modified account identifier and the identity of the merchant. As an example, the second block can be the block 310 shown in FIG. 3I. The first computing system can transmit the second block to the distributed computing network, and transmit a second notification identifying the second block from the first computing system to the second computing system.

In some cases, determining that the account identifier associated with the account has been modified can include determining that a first account identifier associated with the account has been revoked, and determining a replacement account identifier associated with the account.

In some cases, an account identifier can include at least one of an account number, a routing number, a credit card number, or a debit card number.

In some cases, the first block can be encoded, at least in part, based on a public key associated with a financial institution associated with the account and a private key associated with the merchant. The first block can be decodable, at least in part, based on a private key associated with the financial institution and a public key associated with the merchant.

In some cases, the second block can be encoded, at least in part, based on a private key associated with the financial institution and a public key associated with the merchant. The second block can be decodable, at least in part, based on a public key associated with the financial institution and a private key associated with the merchant.

In some cases, the process 400 can further include generating, by the first computing system, validation data corresponding to the second block. The first computing system can transmit the validation data to the distributed computing network.

In some cases, generating the validation data can include applying a proof of stake protocol to the second additional block to obtain a proof of stake value. The proof of stake value can satisfies a predefined requirement of the proof of stake protocol. Transmitting the validation data to the distributed computing network can include transmitting the proof of stake value to the distributed computing network.

In some cases, the process 400 can further include maintaining a local copy of the distributed blockchain on the first computing system. The distributed blockchain can include a plurality of blocks, the plurality of blocks encoding additional authorization data describing one or more previous recurring payment authorizations between one or more users and one or more merchants. The first computing system can append the first block to the local copy of the distributed blockchain.

In some cases, the process 400 can further include appending the second block to the local copy of the distributed blockchain.

In some cases, the first notification can be received from a smart contract agent maintained by the second computing system.

In some cases, the second notification can be transmitted by a smart contract agent maintained by the first computing system.

In some cases, the first notification can include an index value identifying the first block.

In some cases, the first computing system can be associated with a financial institution, and wherein the account is held by the user with the financial institution.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the computing systems 110*a-d* and the authorization platforms 120*a-d* can be implemented using digital electronic circuitry, or in computer software, firmware, or hardware, or in combinations of one or more of them. In another example, processes depicted in FIGS. 3A-L and 4 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computing system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 5:
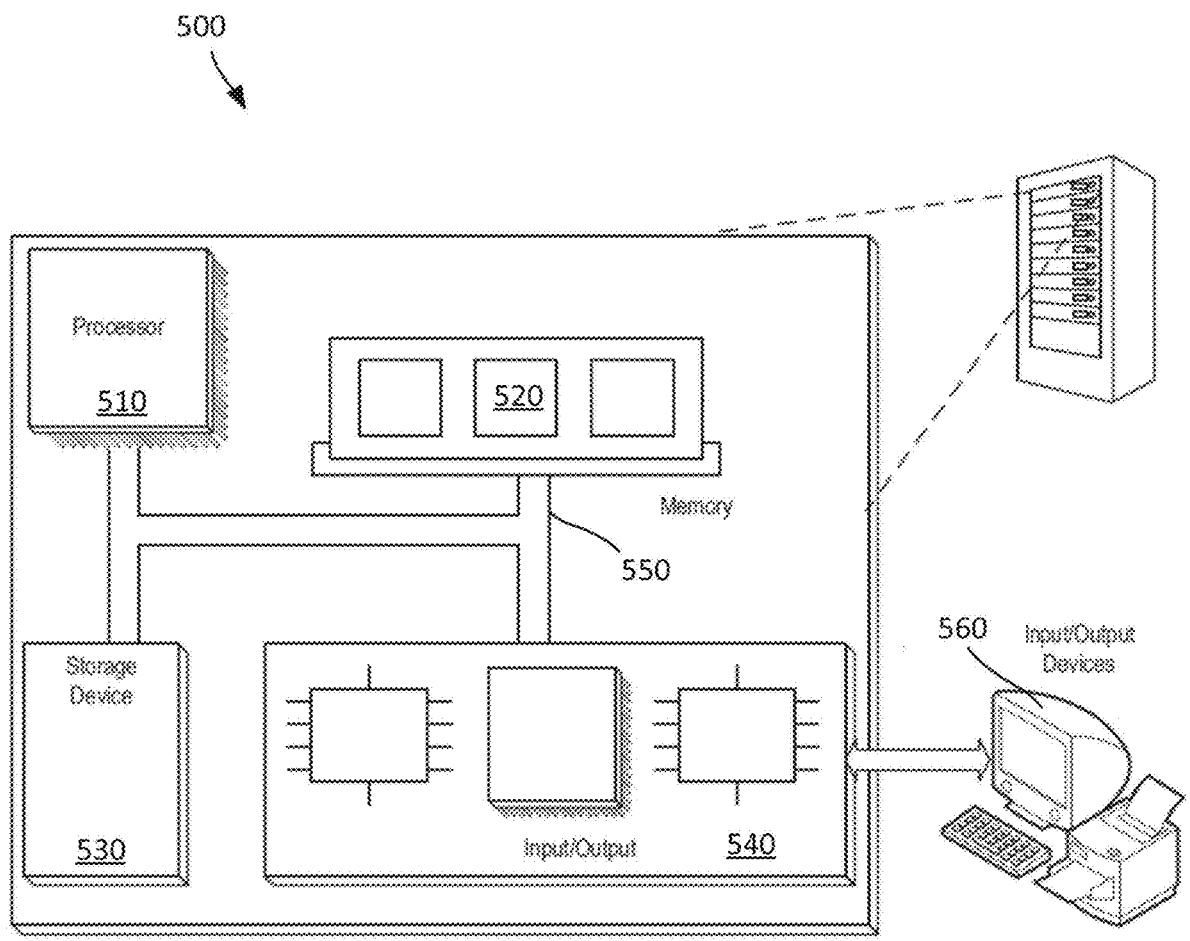
FIG. 5 is a diagram of an example computing system.

FIG. 5 shows an example computing system 500 that includes a processor 510, a memory 520, a storage device 530 and an input/output device 540. Each of the components 510, 520, 530 and 540 can be interconnected, for example, by a system bus 550. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500.

The input/output device 540 provides input/output operations for the system 500. In some implementations, the input/output device 540 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the following claims.

A number of embodiments have been described. Nevertheless, it will be understood that various modifications may be made without departing from the spirit and scope of the invention. Accordingly, other embodiments are within the scope of the claims.

What is claimed is:

1. A computer-implemented method executed by at least one processor, the method comprising:
receiving, at a first computing system in a distributed computing network, a first notification from a second computing system in the distributed computing network, wherein the distributed computing network is configured to access a distributed blockchain comprising a plurality of blocks, wherein each block of the plurality of blocks is associated with a respective recurring payment authorization between a respective user and one merchant, wherein the first computing system is associated with the one merchant, wherein the first notification is automatically transmitted via a smart contract agent of the second computing system, after receiving an update to a first block of the plurality of blocks in the distributed blockchain, wherein the update is associated with a change to a first recurring payment authorization between a first user and the one merchant, and wherein the first notification is indicative of:
the change to the first recurring payment authorization between the first user and the one merchant;
the first block in the distributed blockchain, wherein the first block comprises encoded authorization data representative of:
the first recurring payment authorization;
a replacement account identifier comprising an account identifier associated with an account held by the first user;
an identity of the one merchant; and
a derivative of a token, wherein the derivative of the token is generated by a trusted party of the distributed computing network;
determining, by the first computing system, that the account identifier associated with the first user has been modified based on the first notification;
retrieving, by the first computing system, the first block comprising the replacement account identifier in response to determining that the account identifier associated with the first user has been modified;
verifying, by the first computing system, that the first block is generated by the trusted party of the distributed computing network and that the first block is associated with the first recurring payment authorization by applying a proof of stake protocol to the derivative of the token to determine whether the token is associated with a stake in distributed blockchain;
decoding, by the first computing system, the encoded authorization data in the first block to determine the replacement account identifier to use in the first recurring payment authorization in response to determining the trusted party possesses the token;
updating an internal record stored in a storage component of the first computing system based on decoding the encoded authorization data, wherein the record comprises the first recurring payment authorization and the replacement account identifier; and
conducting, by the first computing system, a transaction for a recurring payment operation using the replacement account identifier and the first recurring payment authorization based on the record.

2. The method of claim 1, wherein determining that the account identifier associated with the account has been modified comprises determining that the account identifier associated with the account has been revoked.

3. The method of claim 1, wherein the account identifier comprises at least one of an account number, a routing number, a credit card number, or a debit card number.

4. The method of claim 1, wherein the first block is encoded, at least in part, based on a first public key associated with a financial institution associated with the account and a first private key associated with the one merchant, and wherein the first block is decodable, at least in part, based on a second private key associated with the financial institution and a second public key associated with the one merchant.

5. The method of claim 1, further comprising:
generating, by the first computing system, validation data corresponding to the first block; and
transmitting the validation data to the distributed computing network.

6. The method of claim 5, wherein generating the validation data comprises applying the proof of stake protocol to the other block in the distributed computing network to obtain a proof of stake value, wherein the proof of stake value satisfies a predefined requirement of the proof of stake protocol, and wherein transmitting the validation data to the distributed computing network comprises transmitting the proof of stake value to the distributed computing network.

7. The method of claim 1, further comprising:
maintaining a local copy of the distributed blockchain on the first computing system, the distributed blockchain comprising a plurality of blocks, the plurality of blocks encoding additional authorization data describing one or more previous recurring payment authorizations between one or more users and one or more merchants; and
appending the first block to the local copy of the distributed blockchain.

8. The method of claim 1, wherein the first notification comprises an index value identifying the first block.

9. The method of claim 1, wherein the second computing system is associated with a financial institution.

10. A system comprising:
a first computing system in a distributed computing network, the first computing system comprising:
one or more processors; and
one or more non transitory computer readable media storing instructions operable to cause one or more processors to perform operations comprising:
receiving, at the first computing system, a first notification from a second computing system in the distributed computing network, wherein the distributed computing network is configured to access to a distributed blockchain comprising a plurality of blocks, wherein each block of the plurality of blocks is associated with a respective recurring payment authorization between a respective user and one merchant, wherein the first computing system is associated with the one merchant, wherein the first notification is automatically transmitted via a smart contract agent of the second computing system, after receiving an update to a first block of the plurality of blocks in the distributed blockchain, wherein the update is associated with a change to a first recurring payment authorization between a first user and the one merchant, and wherein the first notification is indicative of:
the change to the first recurring payment authorization between the first user and the one merchant; and
the first block in the distributed blockchain, wherein the first block comprises encoded authorization data representative of:
the first recurring payment authorization;
a replacement account identifier comprising an account identifier associated with an account held by the first user;
an identity of the one merchant; and
a derivative of a token, wherein the derivative of the token is generated by a trusted party of the distributed computing network;
determining, by the first computing system, that the account identifier associated with the first user has been modified based on the first notification;
retrieving, by the first computing system, the first block comprising the replacement account identifier in response to determining that the account identifier associated with the first user has been modified;
verifying, by the first computing system, that the first block is generated by the trusted party of the distributed computing network and that the first block is associated with the first recurring payment authorization by applying a proof of stake protocol to the derivative of the token to determine whether the token is associated with a stake in distributed blockchain;
decoding, by the first computing system, the encoded authorization data in the first block to determine the replacement account identifier to use in the first recurring payment authorization in response to determining the trusted party possesses the token;
updating an internal record stored in a storage component of the first computing system based on decoding the encoded authorization data, wherein the record comprises the first recurring payment authorization and the replacement account identifier; and
conducting, by the first computing system, a transaction for a recurring payment operation using the replacement account identifier and the first recurring payment authorization based on the record.

11. The system of claim 10, wherein determining that the account identifier associated with the account has been modified comprises determining that the account identifier associated with the account has been revoked.

12. The system of claim 10, wherein the account identifier comprises at least one of an account number, a routing number, a credit card number, or a debit card number.

13. The system of claim 10, wherein the first block is encoded, at least in part, based on a first public key associated with a financial institution associated with the account and a first private key associated with the one merchant, and wherein the first block is decodable, at least in part, based on a second private key associated with the financial institution and a second public key associated with the one merchant.

14. The system of claim 10, wherein the operations further comprise:
generating, by the first computing system, validation data corresponding to the first block; and
transmitting the validation data to the distributed computing network.

15. The system of claim 14, wherein generating the validation data comprises applying the proof of stake protocol to the other block in the distributed computing network to obtain a proof of stake value, wherein the proof of stake value satisfies a predefined requirement of the proof of stake protocol, and wherein transmitting the validation data to the distributed computing network comprises transmitting the proof of stake value to the distributed computing network.

16. The system of claim 10, wherein the operations further comprise:
maintaining a local copy of the distributed blockchain on the first computing system, the distributed blockchain comprising a plurality of blocks, the plurality of blocks encoding additional authorization data describing one or more previous recurring payment authorizations between one or more users and one or more merchants; and
appending the first block to the local copy of the distributed blockchain.

17. The system of claim 10, wherein the first notification comprises an index value identifying the first block.

18. The system of claim 10, wherein the second computing system is associated with a financial institution.

19. The method of claim 1, wherein the change to the first recurring payment authorization is associated with the replacement account identifier for the first user.

20. The system of claim 10, wherein the change to the first recurring payment authorization is associated with the replacement account identifier for the first user.

\* \* \* \* \*